(12) United States Patent
Yun et al.

(10) Patent No.: US 9,075,828 B2
(45) Date of Patent: Jul. 7, 2015

(54) ELECTRONIC DEVICE AND METHOD OF CONTROLLING THE SAME

(75) Inventors: Yeerang Yun, Seoul (KR); Yoomee Song, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 250 days.

(21) Appl. No.: 13/369,198

(22) Filed: Feb. 8, 2012

(65) Prior Publication Data

US 2012/0239673 A1    Sep. 20, 2012

(30) Foreign Application Priority Data

Mar. 16, 2011  (KR) .......................... 10-2011-0023265

(51) Int. Cl.
*G06F 7/00* (2006.01)
*G06F 17/30* (2006.01)

(52) U.S. Cl.
CPC .... *G06F 17/30268* (2013.01); *G06F 17/30244* (2013.01); *G06F 17/30247* (2013.01)

(58) Field of Classification Search
CPC .............. G06F 17/30126; G06F 17/30244; G06F 17/30247; G06F 17/30265; G06F 17/30268; G06F 17/30271
USPC .................................. 707/915, 999.107, 758
See application file for complete search history.

(56) References Cited

U.S. PATENT DOCUMENTS

| | | | | |
|---|---|---|---|---|
| 5,880,740 A * | 3/1999 | Halliday et al. | ............... | 345/629 |
| 6,041,335 A * | 3/2000 | Merritt et al. | .................. | 715/203 |
| 6,049,796 A * | 4/2000 | Siitonen et al. | ............... | 707/711 |
| 6,061,659 A * | 5/2000 | Murray | ....................... | 705/14.73 |
| 6,282,362 B1 * | 8/2001 | Murphy et al. | ................ | 386/224 |
| 6,662,226 B1 * | 12/2003 | Wang et al. | ..................... | 709/224 |
| 7,115,035 B2 * | 10/2006 | Tanaka | ............................ | 463/42 |
| 7,224,991 B1 * | 5/2007 | Fuoss et al. | .................... | 455/466 |
| 7,567,977 B1 * | 7/2009 | White | ................................. | 1/1 |
| 7,634,731 B2 * | 12/2009 | Lee | ................................. | 715/706 |
| 7,669,134 B1 * | 2/2010 | Christie et al. | ................ | 715/758 |
| 8,565,741 B2 * | 10/2013 | Yang | ............................ | 455/414.4 |
| 2005/0245241 A1 * | 11/2005 | Durand et al. | ............. | 455/414.1 |
| 2009/0252383 A1 * | 10/2009 | Adam et al. | ................... | 382/118 |
| 2009/0278948 A1 * | 11/2009 | Hayashi | ...................... | 348/218.1 |
| 2011/0199479 A1 * | 8/2011 | Waldman | ...................... | 348/116 |
| 2011/0273575 A1 * | 11/2011 | Lee | ............................ | 348/222.1 |
| 2011/0298590 A1 * | 12/2011 | Lee et al. | ..................... | 340/10.3 |
| 2012/0001939 A1 * | 1/2012 | Sandberg | ...................... | 345/633 |
| 2012/0015672 A1 * | 1/2012 | Jung | ............................ | 455/456.3 |
| 2012/0026290 A1 * | 2/2012 | Lim et al. | ......................... | 348/46 |
| 2012/0226981 A1 * | 9/2012 | Clavin | .......................... | 715/719 |
| 2014/0285622 A1 * | 9/2014 | Nandhakumar et al. | ......... | 348/43 |

* cited by examiner

*Primary Examiner* — Daniel Kuddus
(74) *Attorney, Agent, or Firm* — Birch, Stewart, Kolasch & Birch, LLP

(57) ABSTRACT

An electronic device including a communication unit configured to communicate with at least one other party; a display module configured to display a message transmitted/received with the at least one other party in a predetermined area; and a controller configured to search for an image comprising a user of the electronic device and the at least one other party and control the display module to display in the predetermined area an image found in the search.

19 Claims, 31 Drawing Sheets

ELECTRONIC DEVICE AND METHOD OF CONTROLLING THE SAME

CROSS REFERENCE TO RELATED APPLICATIONS

Pursuant to 35 U.S.C. §119(a), this application claims the benefit of Korean Patent Application No. 10-2011-0023265 filed on Mar. 16, 2011, the contents of which are hereby incorporated by reference in their entirety.

FIELD OF THE INVENTION

The present invention relates to an electronic device and a method of controlling the same.

BACKGROUND OF THE INVENTION

Electronic devices may be classified as mobile terminals and stationary terminals. The mobile terminals may be classified into handheld terminals or vehicle mount terminals based on whether users can personally carry the terminals.

As various types of services are provided by electronic devices, improvements in structure and/or software of the electronic devices are being considered.

SUMMARY OF THE INVENTION

The present invention relates to an electronic device and a method of controlling the same, and more particularly, to an electronic device and a method of controlling the same that can display a message using an image including a user of the electronic device and another user transmitting/receiving a message.

BRIEF DESCRIPTION OF THE DRAWINGS

The accompanying drawings, which are included to provide further understanding of the disclosure and are incorporated in and constitute a part of this application, illustrate embodiment(s) of the disclosure and together with the description serve to explain the principle of the disclosure.

DETAILED DESCRIPTION OF EMBODIMENTS OF THE INVENTION

The present invention will now be described more fully with reference to the accompanying drawings, in which embodiments of the invention are shown. The invention may, however, be embodied in many different forms and should not be construed as being limited to the embodiments set forth herein; rather, there embodiments are provided so that this disclosure will be thorough and complete, and will fully convey the concept of the invention to those skilled in the art.

In the following description, suffixes "module" and "unit" are given to components of the electronic device in consideration of only facilitation of description and do not have meanings or functions discriminated from each other.

The electronic device described in the specification may include a smart phone, laptop computer, a digital broadcasting terminal, a personal digital assistant (PDA), a portable multimedia player (PMP), a digital TV, a desktop computer, a set-top box, a digital camera, and a navigation system, for example.

Figure 1:
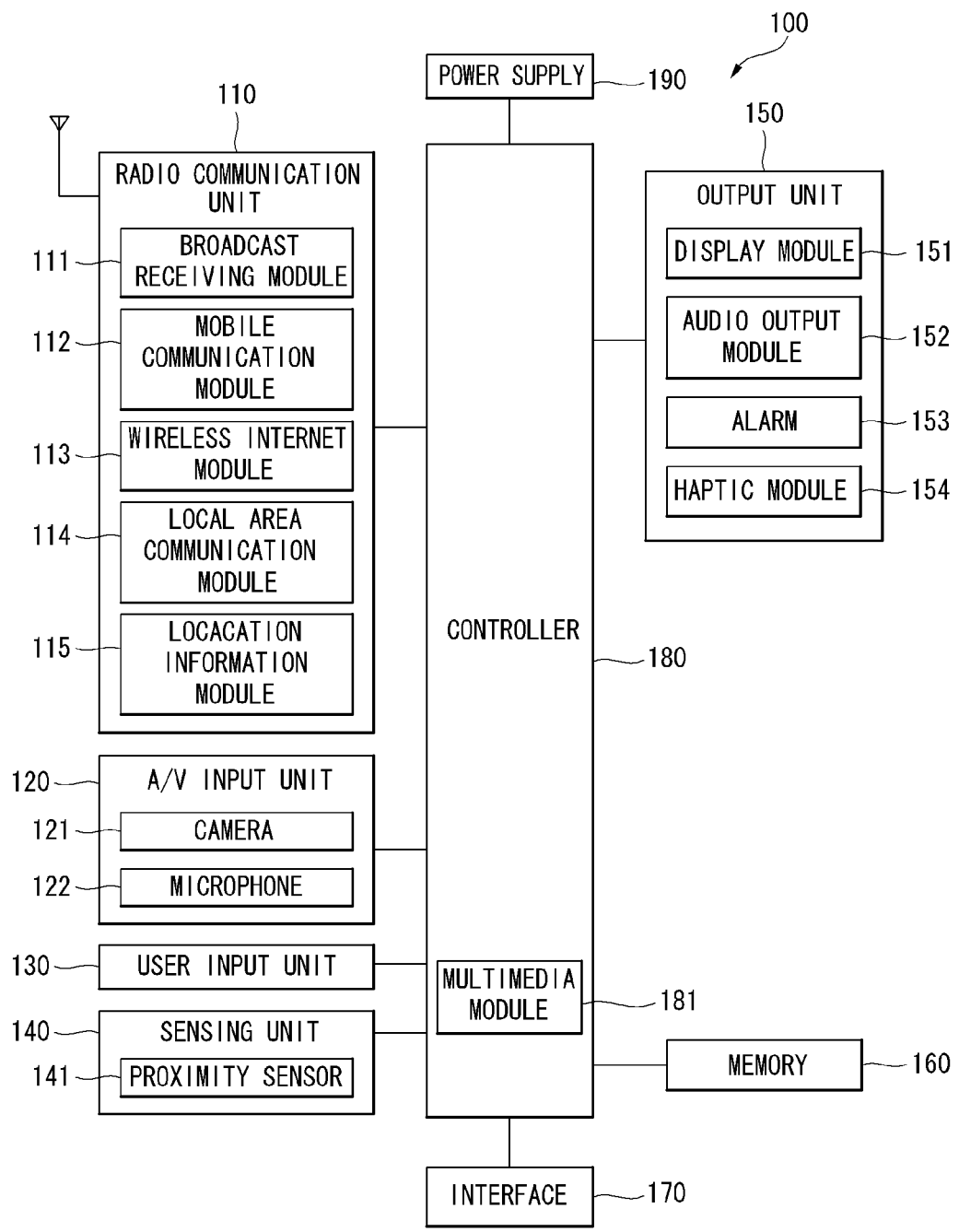
FIG. 1 is a block diagram illustrating a configuration of a mobile terminal according to an embodiment of the present invention.

FIG. 1 is a block diagram of an electronic device 100 according to an embodiment of the present invention. Other embodiments, configurations and arrangements may also be provided. As shown, the electronic device 100 may include a radio communication unit 110, an audio/video (A/V) input unit 120, a user input unit 130, a sensing unit 140, an output unit 150, a memory 160, an interface 170, a controller 180, and a power supply 190. Not all of the components shown in FIG. 1 may be essential parts and the number of components included in the electronic device 100 may be varied. The components of the electronic device 100 will now be described.

The communication unit 110 can include at least one module that enables communication between the electronic device 100 and a communication system or between the electronic device 100 and a network in which the electronic device 100 is located. For example, the communication unit 110 can include a broadcasting receiving module 111, a mobile communication module 112, a wireless Internet module 113, a local area communication module 114 and a location information module 115.

The broadcasting receiving module 111 receives broadcasting signals and/or broadcasting related information from an external broadcasting management server through a broadcasting channel.

The broadcasting channel can include a satellite channel and a terrestrial channel. The broadcasting management server can be a server that generates and transmits broadcasting signals and/or broadcasting related information or a server that receives previously created broadcasting signals and/or broadcasting related information and transmits the broadcasting signals and/or broadcasting related information to the electronic device. The broadcasting signals can include not only TV broadcasting signals, radio broadcasting signals and data broadcasting signals but also signals in the form of combination of a TV broadcasting signal and a radio broadcasting signal.

The broadcasting related information can be information on a broadcasting channel, a broadcasting program or a broadcasting service provider. The broadcasting related information can be provided even through a mobile communication network. In this case, the broadcasting related information can be received by the mobile communication module 112.

The broadcasting related information can exist in various forms. For example, the broadcasting related information can exist in the form of electronic program guide (EPG) of digital multimedia broadcasting (DMB) or in the form of electronic service guide (ESG) of digital video broadcast-handheld (DVB-H).

The broadcasting receiving module 111 receives broadcasting signals using various broadcasting systems. Particularly, the broadcasting receiving module 111 can receive digital broadcasting signals using digital broadcasting systems such as digital multimedia broadcasting-terrestrial (DMB-T), digital multimedia broadcasting-satellite (DMB-S), media forward link only (MediaFLO), DVB-H and integrated services digital broadcast-terrestrial (ISDB-T) systems. The broadcasting receiving module 111 can be constructed to be suited to broadcasting systems providing broadcasting signals other than the above-described digital broadcasting systems.

The broadcasting signals and/or broadcasting related information received through the broadcasting receiving module 111 can be stored in the memory 160.

The mobile communication module 112 transmits/receives a radio signal to/from at least one of a base station, an external device and a server on a mobile communication network. The radio signal can include a voice call signal, a video telephony call signal or data in various forms according to transmission and receiving of text/multimedia messages.

The wireless Internet module 113 means a module for wireless Internet access and can be included in the electronic device 100 or externally attached to the electronic device 100. Wireless LAN (WLAN) (Wi-Fi), wireless broadband (Wibro), world interoperability for microwave access (Wimax), high speed downlink packet access (HSDPA) and so on can be used as a wireless Internet technique.

The local area communication module 114 means a module for local area communication. Bluetooth, radio frequency identification (RFID), infrared data association (IrDA), ultra wideband (UWB) and ZigBee can be used as a local area communication technique.

The location information module 115 confirms or obtains the position of the electronic device. A global positioning system (GPS) module is a representative example of the location information module 115. According to the current technology, the GPS module 115 can calculate information on distances between one point (object) and at least three satellites and information on the time when the distance information is measured and apply trigonometry to the obtained distance information to obtain three-dimensional position information on the point (object) according to latitude, longitude and altitude at a predetermined time. Furthermore, a method of calculating position and time information using three satellites and correcting the calculated position and time information using another satellite is also used. In addition, the GPS module 115 continuously calculates the current position in real time and calculates velocity information using the position information.

Referring to FIG. 1, the A/V input unit 120 is used to input an audio signal or a video signal and can include a camera 121 and a microphone 122. The camera 121 processes image frames of still images or moving images obtained by an image sensor in a video telephony mode or a photographing mode. The processed image frames can be displayed on a display unit 151.

The image frames processed by the camera 121 can be stored in the memory 160 or transmitted to an external device through the communication unit 110. The electronic device 100 can include at least two cameras according to constitution of the electronic device 100.

The microphone 122 receives an external audio signal in a call mode, a recording mode or a speed recognition mode and processes the received audio signal into electric audio data. The audio data can be converted into a form that can be transmitted to a mobile communication base station through the mobile communication module 112 and output in the call mode. The microphone 122 can employ various noise removal algorithms for removing noise generated when the external audio signal is received.

The user input unit 130 receives input data for controlling the operation of the electronic device 100 from a user. The user input unit 130 can include a keypad, a dome switch, a touch pad (constant voltage/capacitance), jog wheel, jog switch and so on.

The sensing unit 140 senses the current state of the electronic device 100, such as open/close state of the electronic device 100, the position of the electronic device 100, whether a user touches the electronic device 100, the direction of the electronic device 100 and acceleration/deceleration of the electronic device 100 and generates a sensing signal for controlling the operation of the electronic device 100. For example, the sensing unit 140 can sense whether a slide phone is opened or closed when the electronic device 100 is the slide phone. Furthermore, the sensing unit 140 can sense whether the power supply 190 supplies power and whether the interface 170 is connected to an external device. The sensing unit 140 can include a proximity sensor.

The output unit 150 generates visual, auditory or tactile output and can include the display unit 151, an audio output module 152, an alarm 153 and a haptic module 154.

The display unit 151 displays information processed by the electronic device 100. For example, the display unit 151 displays UI or graphic user interface (GUI) related to a telephone call when the electronic device is in the call mode. The display unit 151 displays a captured or/and received image, UI or GUI when the electronic device 100 is in the video telephony mode or the photographing mode.

The display unit 151 can include at least one of a liquid crystal display, a thin film transistor liquid crystal display, an organic light-emitting diode display, a flexible display and a three-dimensional display.

Some of these displays can be of a transparent type or a light transmission type. This can be referred to as a transparent display. The transparent display includes a transparent liquid crystal display. The rear structure of the display unit 151 can also be of the light transmission type. According to this structure, a user can see an object located behind the body of the electronic device 100 through an area of the body of the electronic device 100, which is occupied by the display unit 151.

The electronic device 100 can include at least two display units 151 according to constitution of the electronic device 100. For example, the electronic device 100 can include a plurality of displays that are arranged on a single face at a predetermined distance or integrated. Otherwise, the plurality of displays can be arranged on different sides.

In the case where the display unit 151 and a sensor sensing touch (referred to as a touch sensor hereinafter) form a layered structure, which is referred to as a touch screen hereinafter, the display unit 151 can be used as an input device in addition to an output device. The touch sensor can be in the form of a touch film, a touch sheet and a touch pad, for example.

The touch sensor can be constructed such that it converts a variation in pressure applied to a specific portion of the display unit 151 or a variation in capacitance generated at a specific portion of the display unit 151 into an electric input signal. The touch sensor can be constructed such that it can sense pressure of touch as well as the position and area of touch.

When touch input is applied to the touch sensor, a signal corresponding to the touch input is transmitted to a touch controller. The touch controller processes the signal and transmits data corresponding to the processed signal to the controller 180. Accordingly, the controller 180 can detect a touched portion of the display unit 151.

Referring to FIG. 1, the proximity sensor 141 can be located in an internal region of the electronic device, surrounded by the touch screen, or near the touch screen. The proximity sensor senses an object approaching a predetermined sensing face or an object located near the proximity sensor using electromagnetic force or infrared rays without having mechanical contact. The proximity sensor has lifetime longer than that of a contact sensor and has wide application.

The proximity sensor includes a transmission type photo-electric sensor, a direct reflection type photo-electric sensor, a mirror reflection type photo-electric sensor, a high-frequency oscillating proximity sensor, a capacitive proximity sensor, a magnetic proximity sensor, an infrared proximity sensor, etc.

A capacitive touch screen is constructed such that proximity of a pointer is detected through a variation in an electric field according to the proximity of the pointer. In this case, the touch screen (touch sensor) can be classified as a proximity sensor.

For convenience of explanation, an action of approaching the pointer to the touch screen while the pointer it not being in contact with the touch screen such that location of the pointer on the touch screen is recognized is referred to as "proximity touch" and an action of bring the pointer into contact with the touch screen is referred to as "contact touch" in the following description. A proximity touch point of the pointer on the touch screen means a point of the touch screen to which the pointer corresponds perpendicularly to the touch screen when the pointer proximity-touches the touch screen.

The proximity sensor senses proximity touch and a proximity touch pattern (for example, a proximity touch distance, a proximity touch direction, a proximity touch velocity, a proximity touch time, a proximity touch position, a proximity touch moving state, etc.). Information corresponding to the sensed proximity touch action and proximity touch pattern can be displayed on the touch screen.

The audio output module 152 can output audio data received from the communication unit 110 or stored in the memory 160 in a call signal receiving mode, a telephone call mode or a recording mode, a speech recognition mode and a broadcasting receiving mode. The audio output module 152 outputs audio signals related to functions (for example, a call signal incoming tone, a message incoming tone, etc.) performed in the electronic device 100. The audio output module 152 can include a receiver, a speaker, a buzzer, etc.

The alarm 153 outputs a signal for indicating generation of an event of the electronic device 100. Examples of events generated in the electronic device include receiving of a call signal, receiving of a message, input of a key signal, input of touch, etc. The alarm 153 can output signals in forms different from video signals or audio signals, for example, a signal for indicating generation of an event through vibration. The video signals or the audio signals can be also output through the display unit 151 or the audio output module 152.

The haptic module 154 generates various haptic effects that the user can feel. A representative example of the haptic effects is vibration. The intensity and pattern of vibration generated by the haptic module 154 can be controlled. For example, different vibrations can be combined and output or sequentially output.

The haptic module 154 can generate a variety of haptic effects including an effect of stimulus according to arrangement of pins vertically moving for a contact skin face, an effect of stimulus according to jet force or sucking force of air through a jet hole or a sucking hole, an effect of stimulus rubbing the skin, an effect of stimulus according to contact of an electrode, an effect of stimulus using electrostatic force and an effect according to reproduction of cold and warmth using an element capable of absorbing or radiating heat in addition to vibrations.

The haptic module 154 can not only transmit haptic effects through direct contact but also allow the user to feel haptic effects through kinesthetic sense of his fingers or arms. The electronic device 100 can include at least two haptic modules 154 according to constitution of the electronic device.

The memory 160 can store a program for the operation of the controller 180 and temporarily store input/output data (for example, phone book, messages, still images, moving images, etc.). The memory 160 can store data about vibrations and sounds in various patterns, which are output from when a touch input is applied to the touch screen.

The memory 160 can include at least one of a flash memory, a hard disk type memory, a multimedia card micro type memory, a card type memory (for example, SD or XD memory), a random access memory (RAM), a static RAM (SRAM), a read-only memory (ROM), an electrically erasable programmable ROM (EEPROM), a programmable ROM (PROM) magnetic memory, a magnetic disk and an optical disk. The electronic device 100 can operate in relation to a web storage performing the storing function of the memory 160 on the Internet.

The interface 170 serves as a path to all external devices connected to the electronic device 100. The interface 170 receives data from the external devices or power and transmits the data or power to the internal components of the electronic device 100 or transmits data of the electronic device 100 to the external devices. The interface 170 can include a wired/wireless headset port, an external charger port, a wired/wireless data port, a memory card port, a port for connecting a device having a user identification module, an audio I/O port, a video I/O port, an earphone port, etc., for example.

An identification module is a chip that stores information for authenticating the authority to use the electronic device 100 and can include a user identify module (UIM), a subscriber identify module (SIM) and a universal subscriber identify module (USIM). A device (referred to as an identification device hereinafter) including the identification module can be manufactured in the form of a smart card. Accordingly, the identification device can be connected to the electronic device 100 through a port.

The interface 170 can serve as a path through which power from an external cradle is provided to the electronic device 100 when the electronic device 100 is connected to the external cradle or a path through which various command signals inputted by the user through the cradle to the electronic device 100. The various command signals or power input from the cradle can be used as a signal for confirming whether the electronic device 100 is correctly set in the cradle.

The controller 180 controls the overall operation of the electronic device. For example, the controller 180 performs control and processing for voice communication, data communication and video telephony. The controller 180 can include a multimedia module 181 for playing multimedia.

The multimedia module 181 can be included in the controller 180 or separated from the controller 180.

The controller 180 can perform a pattern recognition process capable of recognizing handwriting input or picture-drawing input applied to the touch screen as characters or images.

The power supply 190 receives external power and internal power and provides power required for the operations of the components of the electronic device under the control of the controller 180.

Various embodiments of the present invention can be implemented in a computer or similar device readable recording medium using software, hardware or a combination thereof, for example.

According to hardware implementation, the embodiments of the present invention can be implemented using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electrical units for executing functions. In some cases, the embodiments can be implemented by the controller 180.

According to software implementation, embodiments such as procedures or functions can be implemented with a separate software module executing at least one function or operation. Software codes can be implemented according to a software application written in an appropriate software language. Furthermore, the software codes can be stored in the memory 160 and executed by the controller 180.

Hereinafter, an embodiment of the present invention will be described.

An embodiment disclosed in this document can be embodied in the electronic device 100 described with reference to FIG. 1. Hereinafter, operation of the electronic device 100 for embodying an embodiment disclosed in this document will be described in detail.

The memory 160 stores a plurality of contact information corresponding to different persons. The contact information includes a user image, a name, a nickname, a phone number, an e-mail address, a homepage address, and a social network service (SNS) account of each person.

Further, the memory 160 stores a plurality of contents. Contents stored in the memory 160 may include an image such as pictures included in an album and a user image included in previously stored contact information. In each image stored in the memory 160, tag information is stored to correspond to the each image. Further, tag information includes personal information of a person included in the image. When persons included in the image are plural, the memory 160 may store tag information including personal information corresponding to each person included in the image.

The controller 180 extracts an area in which a person is displayed from an image through image recognition of the image. Further, the controller 180 may perform face recognition of an image using a user image included in previously stored contact information or an image corresponding to tag information and determine a person included in the image based on the face recognition. Information acquired by such a method, i.e., information representing who is a person included in the image may be stored in a tag information form of a corresponding image, as described above. Further, the controller 180 may use the information when acquiring an image including users transmitting/receiving a message.

Further, the controller 180 transmits and receives a message with at least one other user through the communication unit 110. Further, the controller 180 provides a predetermined area for displaying the transmitted/received message. Further, the controller 180 searches for at least one image including another party transmitting/receiving a message through the communication unit 110 and a user of the electronic device 100 and displays the found at least one image in a predetermined area in which a message is displayed. This document illustrates a case of displaying a background image of a predetermined area in which a message is displayed using the found at least one image. However, the present invention is not limited thereto. A technical idea provided in this document can be applied to a case of displaying the found at least one image in a partial area in which a message is displayed.

Hereinafter, an area of displaying a message is referred to as a 'message display area'. Further, another user transmitting/receiving a message with a user of the electronic device 100 through the communication unit 110 is referred to as 'another party' or 'other party.'

A message disclosed in this document may include a message of various forms transmitted/received through the communication unit 110 such as a short message service (SMS), a multimedia message service (MMS), an instant message (IM), and e-mail. An embodiment of the present invention illustrates a case of displaying an IM transmitted/received with at least one other party. However, the present invention is not limited thereto. A technical idea disclosed in this document can be applied even to a case of displaying other kinds of messages such as an SMS, an e-mail, and an MMS. For example, a technical idea disclosed in this document can be applied even to a case of displaying SMS/MMSs in which the user of the electronic device 100 and another user transmit and receive on a screen. Further, for example, a technical idea disclosed in this document can be applied even to a case of displaying e-mails in which the user of the electronic device 100 and another user or a specific e-mail account transmit and receive on a screen.

Hereinafter, a mode in which the user of the electronic device 100 communicates with at least one other party using an instant message is referred to as a 'communication mode'. Further, in a communication mode, a group of users communicating using an instant message is referred to as a 'message transmitting/receiving group'. The message transmitting/receiving group includes a user of the electronic device 100 and at least one other user transmitting/receiving a message with the user of the electronic device 100, and users included in the message transmitting/receiving group share all instant messages transmitted/received within the message transmitting/receiving group.

Further, hereinafter, it is assumed that the display module 151 is a touch screen 151. As described above, the touch screen 151 can perform both an information display function and an information input function. However, the present invention is not limited thereto.

Further, hereinafter, a touch gesture is a gesture embodied by a contact touch or a proximity touch of the touch screen 151, and a touch input is an input received by a touch gesture. The touch gesture is classified into tapping, drag, flicking, press, and multi touch according to an action. Tapping is an action of lightly pressing one time the touch screen 151 and is a touch gesture such as a click touch of a mouse in a general computer. Further, drag is an action of moving a finger to a specific position when touching the touch screen 151, and when dragging an object, the corresponding object may continue to move in a drag direction and be displayed. Further, flicking is an action of moving in a specific direction (a right side, a left side, an upper side, a lower side, and a diagonal line) and removing the finger after touching the touch screen 151, and when a touch input is received by flicking, the mobile terminal 100 performs a processing of a specific operation based on a flicking direction or speed. For example, the mobile terminal 100 may perform an action of turning a page of an e-book based on a flicking direction. Further, press is an action of continuing to sustain a touch for a predetermined time period or more after touching the touch screen 151. Further, a multi touch is an action of simultaneously touching a plurality of points of the touch screen 151.

Hereinafter, a method of controlling an electronic device 100 and operation of the electronic device 100 for performing the same according to an embodiment of the present invention will be described in detail with reference to necessary drawings.

Figure 2:
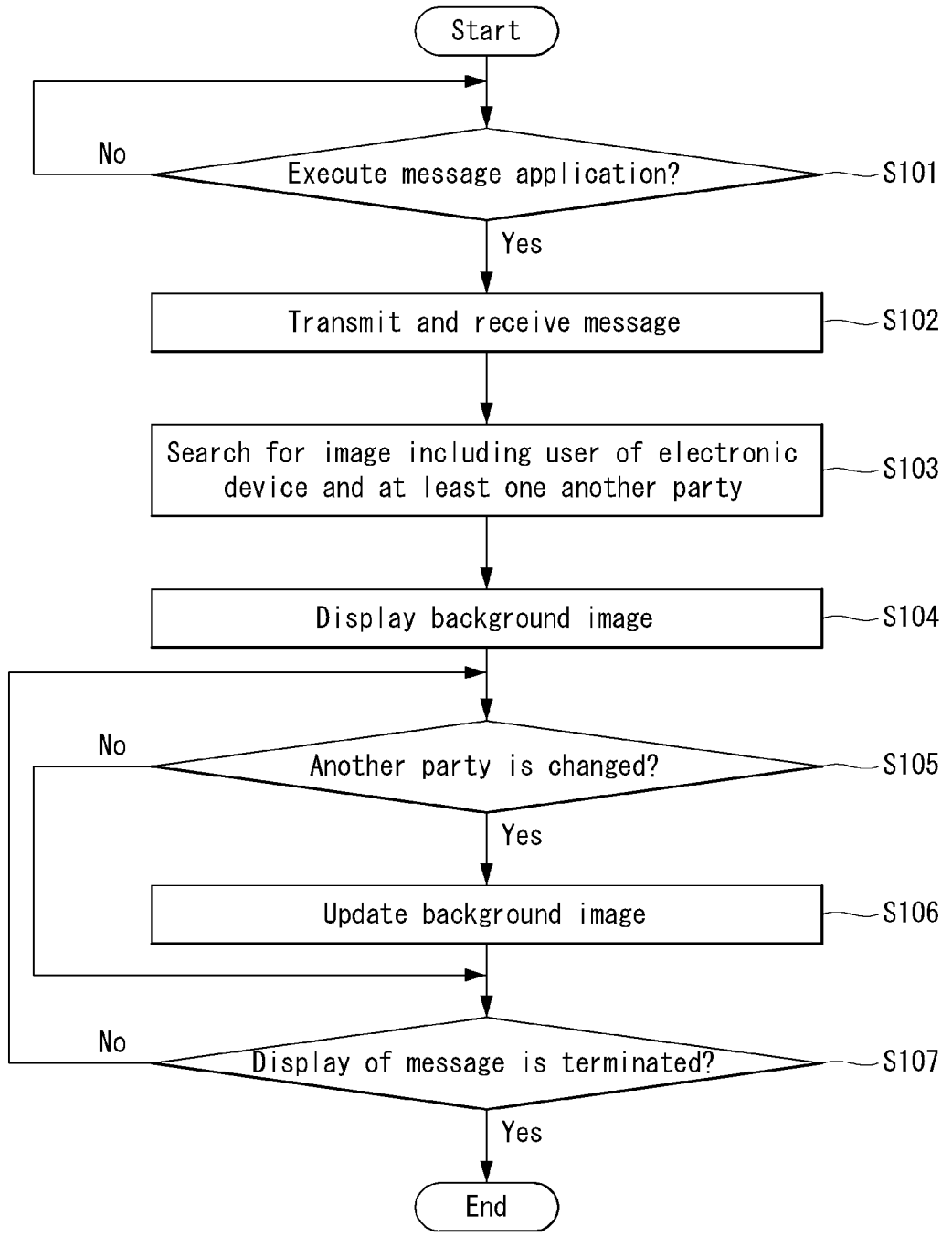
FIG. 2 is a flowchart illustrating a method of controlling an electronic device according to an embodiment of the present invention.

FIG. 2 is a flowchart illustrating a method of controlling the electronic device 100 according to an embodiment of the present invention and illustrates a method of displaying an instant message transmitting/receiving with at least one other user in the electronic device 100. Further, FIGS. 3 to 30 illustrate a method of displaying an instant message transmitted/received in the electronic device 100 according to an embodiment of the present invention.

Referring to FIG. 2, the controller 180 determines whether to execute an instant message application for transmitting/receiving an instant message (S101), and if an instant message application for transmitting/receiving an instant message is executed (Yes in S101), the controller 180 transmits and receives an instant message to and from at least one other user (S102).

When an instant message application is executed, in order to use an instant message service, the controller 180 attempts to log in to a server for providing an instant message service. Further, when the controller 180 logs in to the server, the user communicates using an instant message with at least one other user logged in the server. That is, when the user of the electronic device 100 logs in the server, the controller 180 transmits and receives an instant message with one to one or a group with at least one user logged in the server. When transmitting/receiving an instant message with a group, the controller 180 communicates using an instant message at the same time with a plurality of other users.

When an instant message application is executing in a foreground or a background, the controller 180 receives a control input for entering a communication mode using an instant message with various methods.

FIGS. 3 to 6 illustrate examples of entering a communication mode using an instant message in an electronic device according to an embodiment of the present invention.

Figure 3:
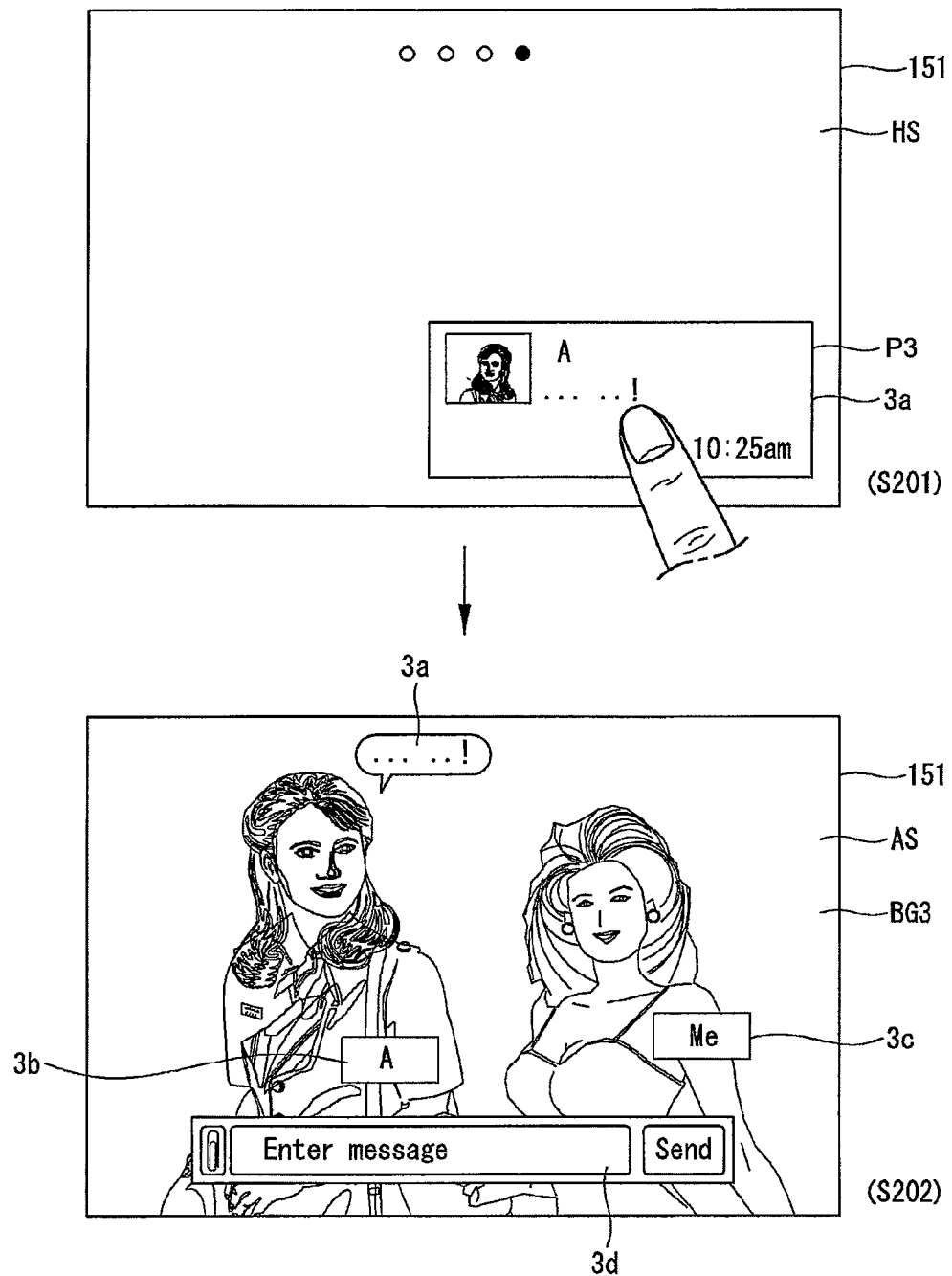
FIGS. 3 to 6 illustrate examples of entering a communication mode using an instant message in an electronic device according to an embodiment of the present invention.

Referring to FIG. 3, when entering a home screen HS, when an instant message is received from another user A, the controller 180 displays a pop-up window P3 notifying that an instant message is received in some area of the touch screen 151. Thereafter, when the pop-up window P3 is touched (S201), the controller 180 terminates the home screen HS. Further, the controller 180 executes an instant message application in a foreground, and the controller 180 displays an execution screen AS of an instant message application on the touch screen 151. Further, the controller 180 enters a communication mode with another party A, having transmitted an instant message 3a (S202).

When entering a communication mode, the controller 180 displays instant messages 3a transmitted/received between a user M of the electronic device 100 entered in a communication mode and another party A on the touch screen 151. Further, the controller 180 searches for at least one image including users A and M entered in a communication mode and displays a background image BG3 of an area in which the message is displayed using the found image. Further, the controller 180 displays identification information 3b and 3c for identifying users A and M entered in a communication mode on the touch screen 151. Here, the identification information may include a name, a nickname, a social security number, a phone number, and a picture of a corresponding person. Further, the controller 180 displays an input window 3d for inputting an instant message in which the user M of the electronic device 100 is to transmit to another party A on the touch screen 151.

Figure 4:
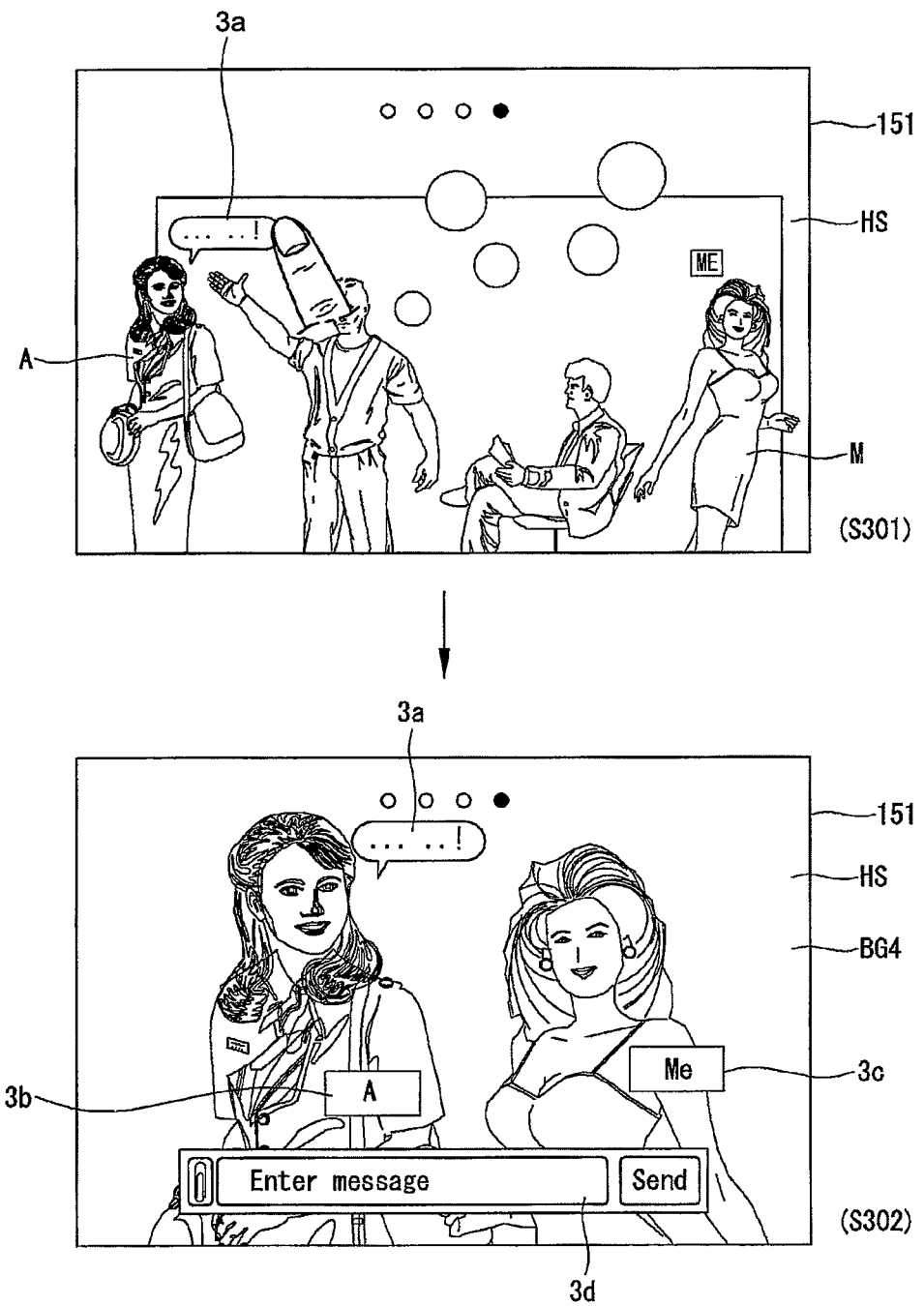

Referring to FIG. 4, in a state entered the home screen HS, when an instant message is received from another user A, the controller 180 displays the received instant message 3a on the home screen HS. When another party, having transmitted the instant message 3a is a person A included in the background image of the home screen HS, the controller 180 displays the received instant message 3a within a predetermined distance from an area in which a corresponding person A is displayed on the home screen HS.

For this, the controller 180 performs image recognition of the background image of the home screen HS and extracts persons A, B, C, and M displayed in the home screen HS background image based on an image recognition result. Further, by performing face recognition of each extracted persons, the controller 180 determines persons A, B, C, and M included in the background image. Further, the controller 180 may determine persons A, B, C, and M based on tag information corresponding to the background image. As persons A, B, C, and M included in the background image is determined, when an instant message 3a is received from one person A displayed in the background image, the controller 180 displays the received instant message 3a within a predetermined distance from an area in which a corresponding person A is displayed.

Referring again to FIG. 4, when the instant message 3a displayed on the home screen HS is touched (S301), the controller 180 enters a communication mode with another party A, having transmitted a corresponding instant message (S302). Further, as entering a communication mode, the controller 180 displays instant messages 3a transmitted/received between users A and M entered in a communication mode on the touch screen 151. Further, the controller 180 displays a background image BG4 of the home screen HS using an image including users A and M entered in a communication mode.

As shown in FIG. 4, when the electronic device 100 enters a communication mode using an instant message in a state entered the home screen HS, the controller 180 displays the transmitted/received instant message 3a on the home screen HS. Accordingly, a display area of the home screen HS is provided as a message display area.

Figure 5:
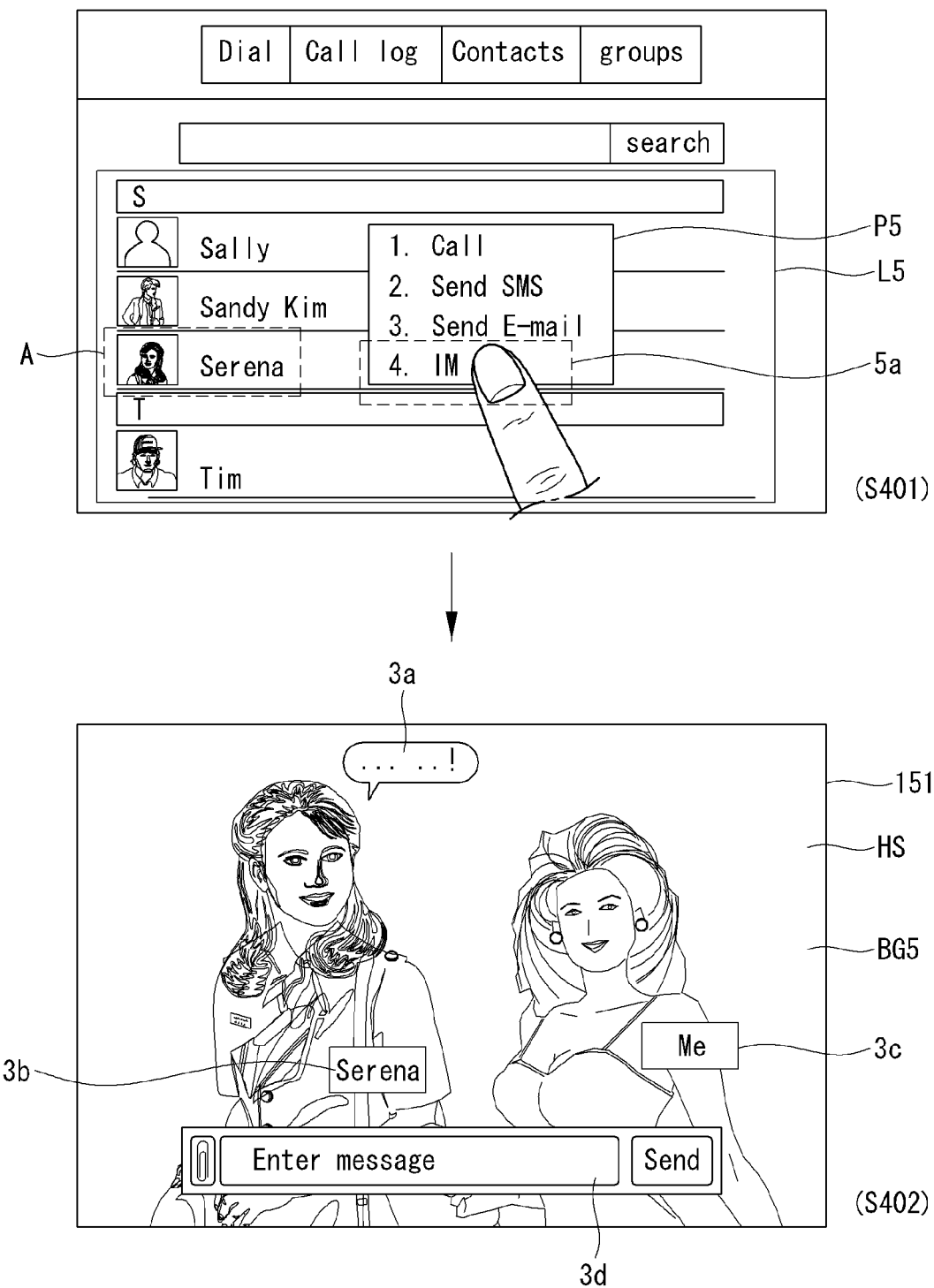

Referring to FIG. 5, the controller 180 displays a list L5 of previously stored contact information on the touch screen 151 according to a user's request. Further, when another user A is selected from the list L5, the controller 180 displays a list of functions related to the selected another user A in a pop-up window P5 form. Further, as an instant message function 5a is selected from the pop-up window P5 (S401), the controller 180 executes an instant message application in a foreground. Further, the controller 180 enters a communication mode with the selected other user A using an instant message. Further, the controller 180 displays a background image BG5 of the home screen HS using an image including users A and M entering in a communication mode.

After entering a communication mode, the controller 180 displays instant messages 3a transmitted/received between users A and M entered in the communication mode on the touch screen 151 (S402).

Figure 6:
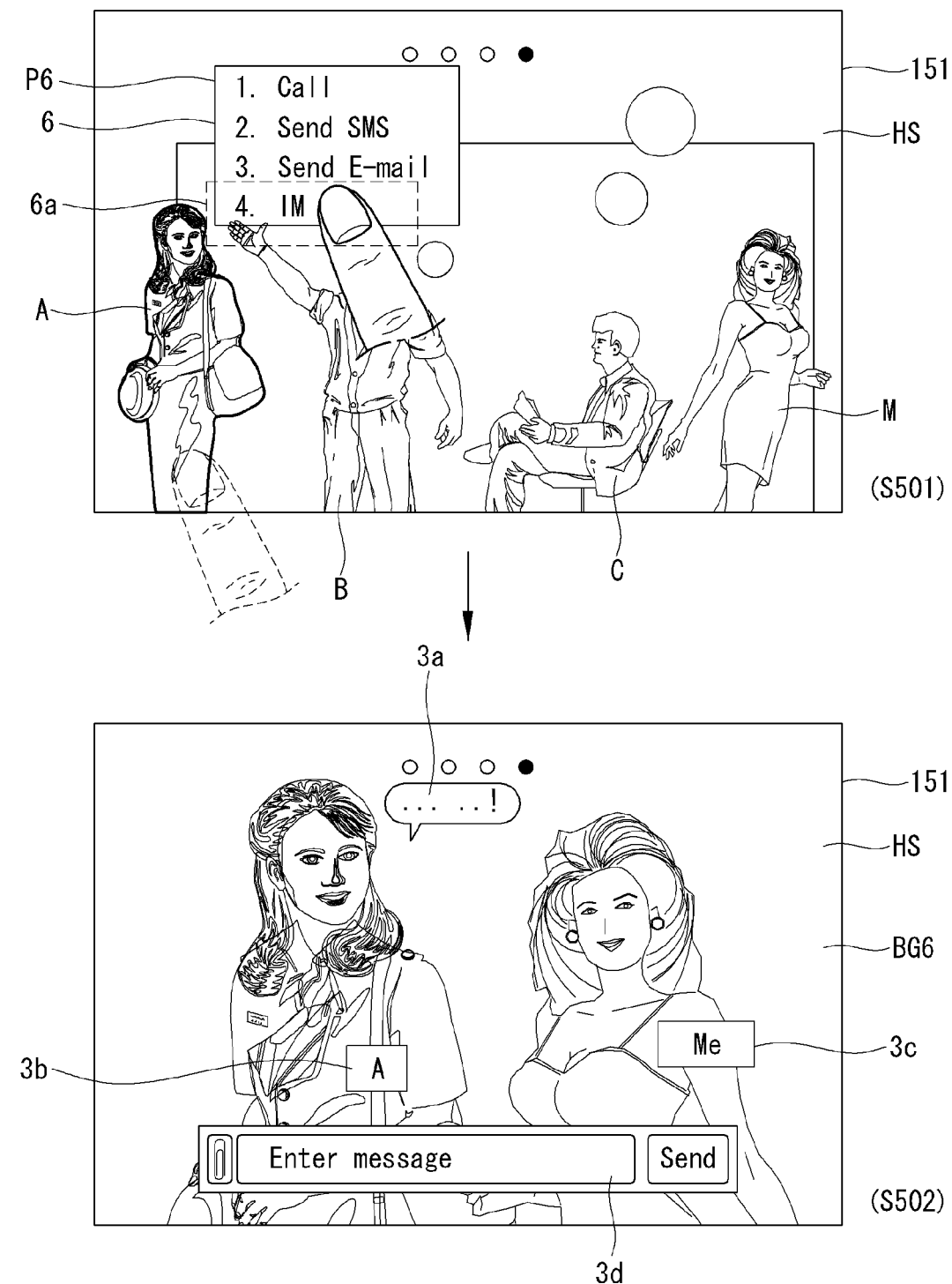

Referring to FIG. 6, when a person A displayed in a background image of the home screen HS is selected, the controller 180 displays a plurality of functions related to the selected person A in a form of a pop-up window P6. Here, the controller 180 may determine the selected person A based on face recognition of each person displayed in a background image of the home screen HS or determine the selected person A based on tag information corresponding to a background image of the home screen HS.

When an instant message function 6a of a plurality of functions displayed in the pop-up window P6 is selected (S501), the controller 180 enters a communication mode using an instant message with the selected person A (S502). Further, as entering a communication mode, the controller 180 displays instant messages 3a transmitted/received between users A and M entered in a communication mode on the touch screen 151. Further, the controller 180 displays a background image BG6 of the home screen HS using an image including the users A and M entered in a communication mode.

Referring again to FIG. 2, when entering a communication mode using an instant message, the controller 180 provides at least a portion of the touch screen 151 as a message display area.

FIGS. 7 to 10 illustrate examples of a screen for displaying an instant screen transmitted/received in an electronic device according to an embodiment of the present invention.

Figure 7:
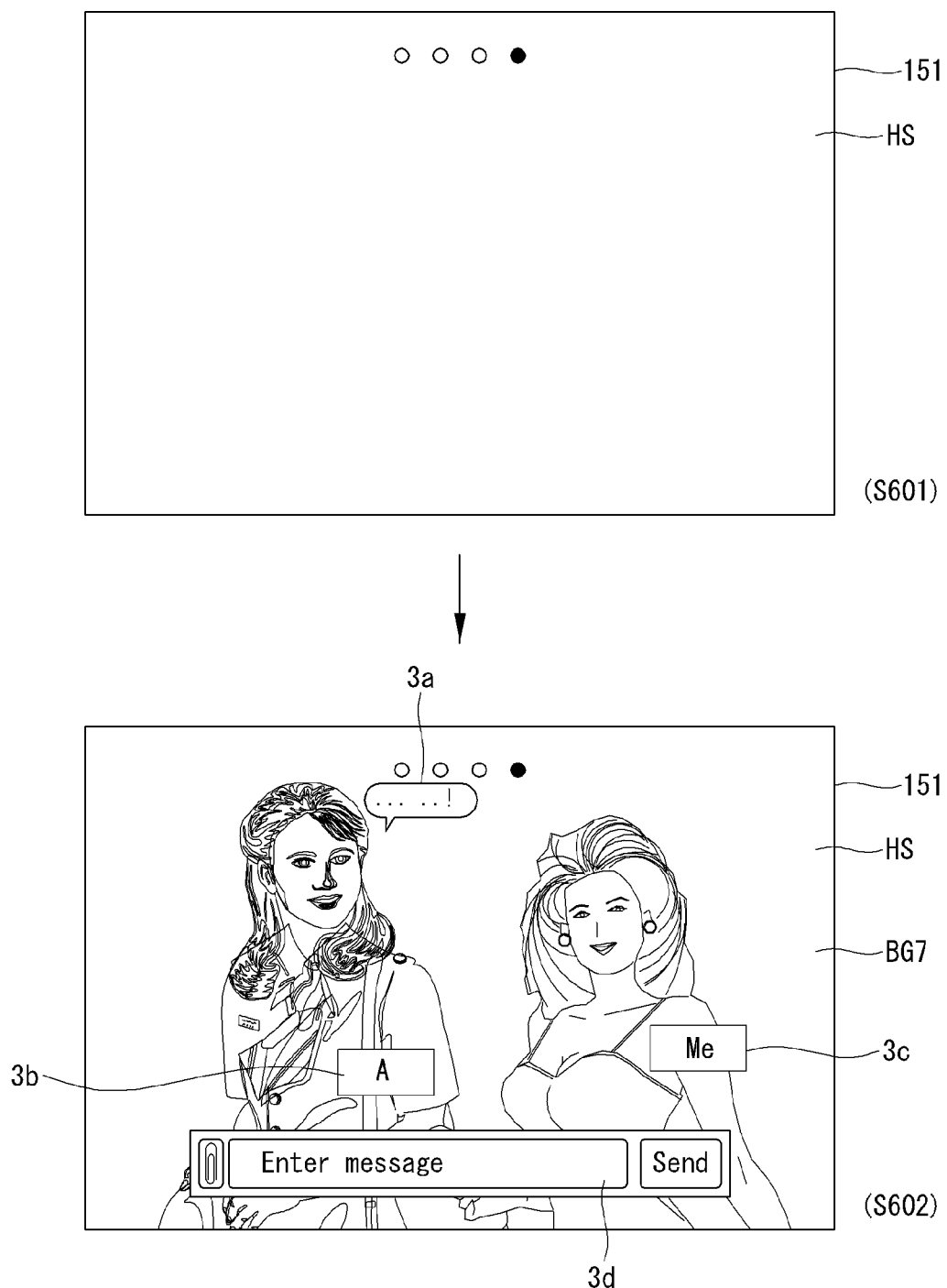
FIGS. 7 to 10 illustrate examples of a screen for displaying an instant message transmitted/received in an electronic device according to an embodiment of the present invention.

Referring to FIG. 7, when entering a home screen, the controller 180 displays the home screen HS on the touch screen 151 (S601). Thereafter, as shown in FIGS. 4 and 6, the controller 180 enters a communication mode using an instant message with another party A according to a user's request (S602).

Further, as entering a communication mode, the controller 180 displays instant messages 3a transmitted/received between users A and M entered in a communication mode on the touch screen 151. Further, the controller 180 displays a background image BG7 of the home screen HS using an image including users A and M entered in a communication mode. Further, the controller 180 extracts persons A and M displayed in the background image BG7 through image recognition of the background image BG6 and selects communicating users A and M using a present instant message among the extracted persons A and M. Further, the controller 180 displays the instant message 3a transmitted/received in a communication mode within a predetermined distance from an area in which the selected users A and M are displayed. Here, the instant message 3a may be displayed in various forms. In FIG. 7, for example, an instant message 3a transmitted/received between the user of the electronic device 100 and the other party A may be displayed in a speech balloon form.

In order to extract users A and M entered in a communication mode in the background image BG7, the controller 180 performs image recognition of the background image BG7. First, the controller 180 acquires an area in which persons A and M is displayed from the background image BG7 through image recognition of the background image BG7. Further, the controller 180 determines users A and M transmitting/receiving an instant message among persons A and M displayed in the background image through face recognition of the persons A and M included in the background image. Further, the controller 180 acquires an area in which users A and M transmitting/receiving an instant message are displayed from the background image based on a face recognition result.

Further, referring to FIG. 7, as described above, when the controller 180 acquires an area in which users A and M transmitting/receiving an instant message are displayed from the background image, the controller 180 may display identification information 3b and 3c for identifying the users A and M within a predetermined distance from an area in which each of the users A and M is displayed. Here, the identification information may include a name, a nickname, a social security number, a phone number, and a picture of a corresponding person.

Further, referring to FIG. 7, the controller 180 displays the input window 3d in which the user M of the electronic device 100 is to input an instant message to transmit to another party A communicating using an instant message on the home screen HS. Accordingly, the user can communicate using an instant message with at least one other user on the home screen.

The controller 180 preferentially displays recently transmitted/received instant messages among instant messages transmitted/received between users A and M entered in a communication mode on the screen. That is, when entered in a communication mode, the controller 180 preferentially displays an instant message in which the user M of the electronic device 100 finally transmits or an instant message in which the user M of the electronic device 100 finally receives on the screen. Further, the controller 180 may display a history of an instant message transmitted/received between users A and M in a communication mode based on a touch gesture of a message display area, i.e., instant messages transmitted/received between the user M and another user A after being entered in a communication mode on the touch screen 151. For example, in a message display area, when any one instant message or an area in which any one user A or M is displayed is touched, the controller 180 may display at least one instant message transmitted/received after entering a communication mode on the touch screen 151.

As shown in FIG. 7, while displaying an instant message transmitted/received on the home screen HS, when a communication mode is terminated, the controller 180 changes and displays the background image of the home screen HS to a background image before entering a communication mode. That is, the controller 180 displays a previously set image as a background image of the home screen HS instead of an image BG7 including users A and M entered in a communication mode as a background image.

In a state entered at the home screen, the controller 180 may display state information of other users registered as a friend of the user of the electronic device 100 in a server for providing an instant message service without executing an instant message application in a foreground or entering a communication mode using the background image of the home screen.

For this, the controller 180 extracts persons included in the home screen background image through image recognition of the background image of the home screen. Further, the controller 180 determines whether a person registered as a friend of the user of the electronic device 100 exists in a server for providing an instant message service among extracted persons. Further, the controller 180 acquires state information of the person registered as a friend of the user of the electronic device 100 from the server based on corresponding contact information. Further, the controller 180 displays the acquired state information in the background image of the home screen. Here, the state information is information representing a state such as log in, seat absence, on the phone, and other business of a corresponding user in the server.

By displaying state information of another user registered as a friend of the user of the electronic device 100 on the home screen, the controller 180 displays a state such as log in, seat absence, on the phone, and other business of some of other users registered as a friend of the user of the electronic device 100 without executing an instant message application. Accordingly, even When an instant message application is not executed, the user can determine a state of friends.

Figure 8:
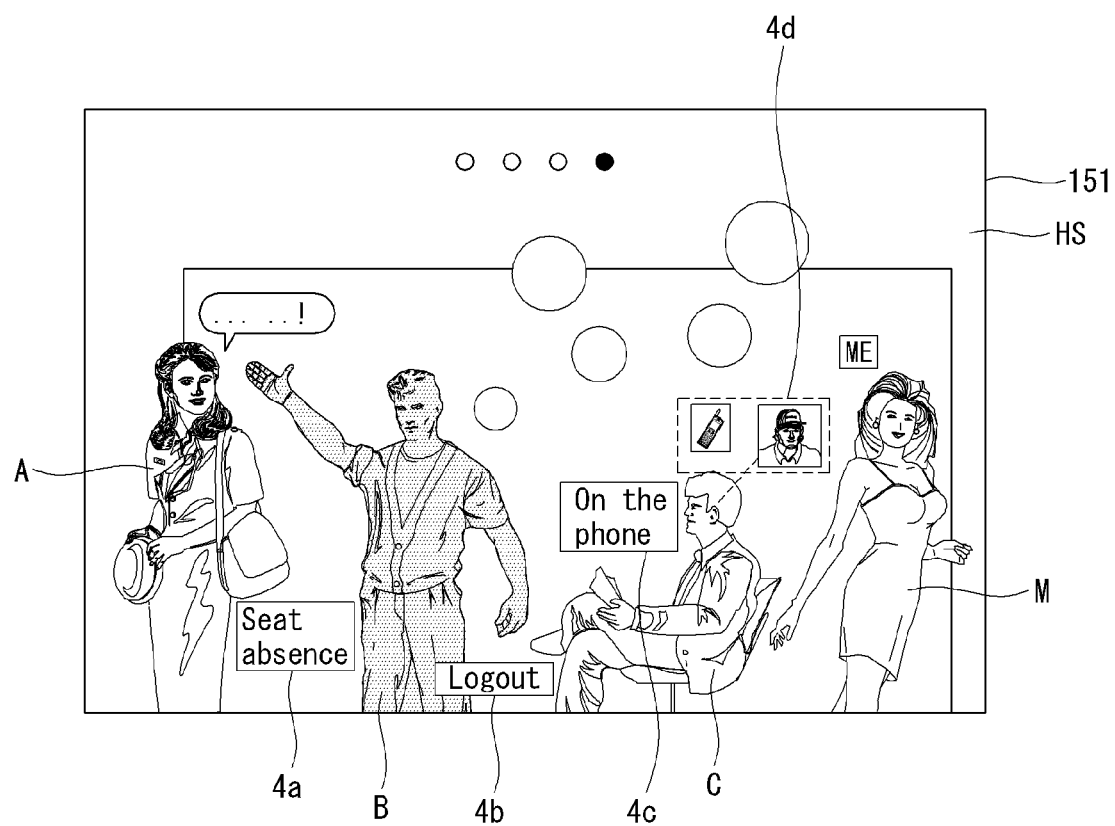

FIG. 8 illustrates an example of a screen for displaying state information of users using an instant message service through a home screen.

Referring to FIG. 8, the controller 180 displays the home screen HS as the touch screen 151. Further, the controller 180 extracts persons A, B, C, and M displayed in a background image of the home screen HS. Further, the controller 180 performs face recognition of each person A, B, C, and M extracted from a background image using previously stored contact information in an instant message service. Further, the controller 180 determines each person A, B, C, and M included in the background image of the home screen HS based on a face recognition result. Referring to FIG. 8, the user M of the electronic device 100 is displayed in the background image of the home screen HS, and a plurality of persons A, B, and C registered as a friend of the user M of the electronic device 100 are displayed in the server.

When each person A, B, C, and M included in the background image of the home screen HS is determined, the controller 180 receives state information of each person A, B, and C from a server for providing an instant message service based on contact information of each person A, B, and C. Further, the controller 180 displays received state information 4a, 4b, and 4c within a predetermined distance from an area in which a corresponding person is displayed.

Referring to FIG. 8, the controller 180 displays information 4a, 4b, and 4c representing seat absence, logout, and on the phone states of friends A, B and C, respectively, of the user of the electronic device 100 based on the received state information. Further, for the friend C on the phone, the controller 180 may display information representing another party while communicating by displaying together an image 4d of another party while communicating on the touch screen 151. Further, for the friend B in a logout state, the controller 180 differently displays a display characteristic of an area in which the friend B is displayed in the background image from that of the remaining area. That is, in the background image, the controller 180 differently displays the friend B from the remaining friends A, and C in a contrast, a color, and transmittance.

As shown in FIG. 7, when a home screen is displayed, when entering a communication mode using an instant message, and when the home screen is not terminated, the controller 180 displays an execution screen of an instant message application in a background of the home screen. However, the present invention is not limited thereto. In the present invention, when the home screen is displayed, and when entering a communication mode using an instant message, the controller 180 may terminate the home screen and display an execution screen of an instant message application as an entire screen.

Figure 9:
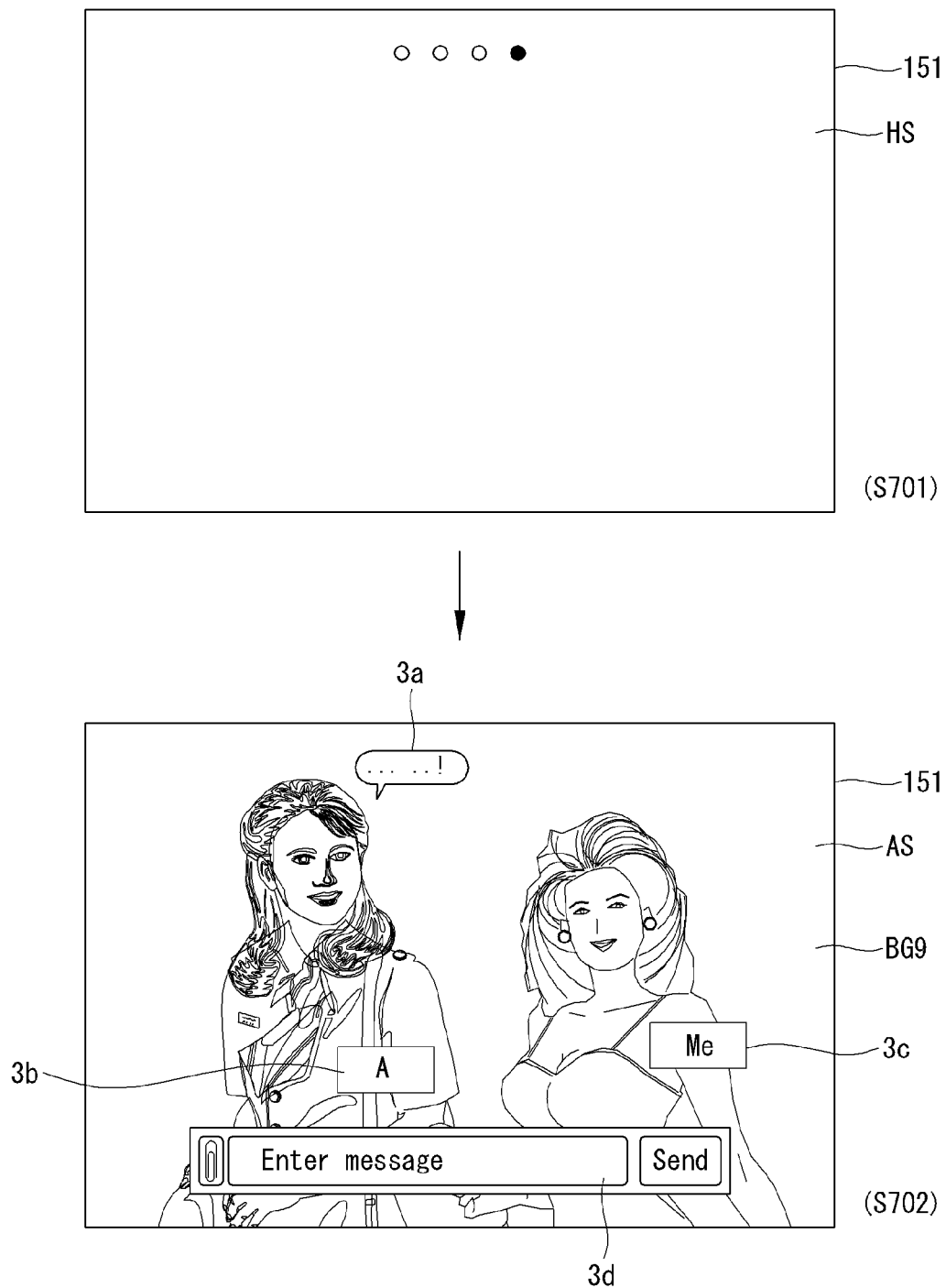

Referring to FIG. 9, the controller 180 displays the home screen HS on the touch screen 151 (S701). Further, when the home screen HS is executing, and when entering a communication mode communicating using an instant message with another user A, the controller 180 terminates the home screen. The controller 180 executes an instant message application and displays an execution screen AS of the application on the touch screen 151 (S702). Further, the controller 180 displays a background image BG9 of the home screen HS using an image including users A and M entered in a communication mode. The controller 180 displays an instant message 3a transmitted/received between users A and M entered in a communication mode on a background image BG9.

Figure 10:
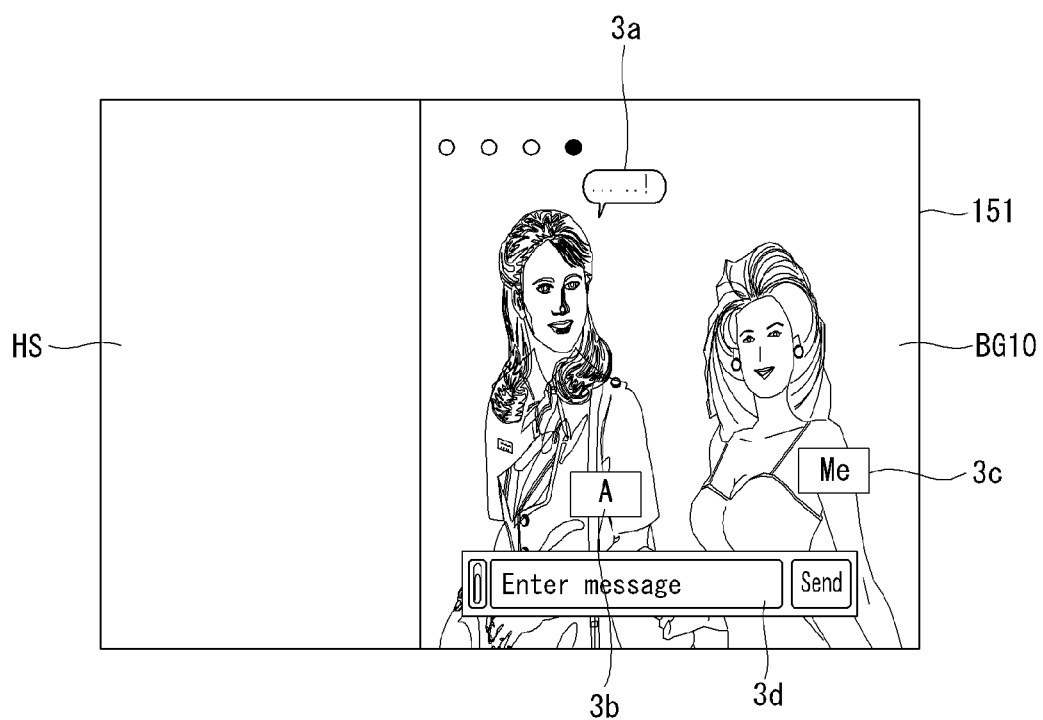

As shown in FIGS. 6 to 9, the controller 180 may provide an entire area of the touch screen 151 as a message display area, but the present invention is not limited thereto. According to the present invention, the controller 180 may be provided a partial area of the touch screen 151 as a message display area in which an instant message is displayed. FIG. 10 illustrates an example of providing a partial area of the touch screen 151 as a message display area.

Referring to FIG. 10, the controller 180 enters a communication mode with another user A when the home screen HS is displayed.

Further, as entered in a communication mode, the controller 180 provides a partial area of the home screen HS as a message display area. Further, the controller 180 displays an image BG10 including users A and M entered in a communication mode as the background image BG10 of the message display area and to display an instant message 3a transmitted/received between users A and M to be overlapped on a background image.

Referring again to FIG. 2, when entering a communication mode using an instant message with at least one other user, the controller 180 searches for an image including the user of the electronic device 100 and at least one other party transmitting/receiving an instant message (S103).

Further, the controller 180 displays the found image as a background image of an area in which an instant message is displayed (S104).

At step S103, the controller 180 acquires images to be used in order to display a background image of a message display area with various methods.

Figure 11:
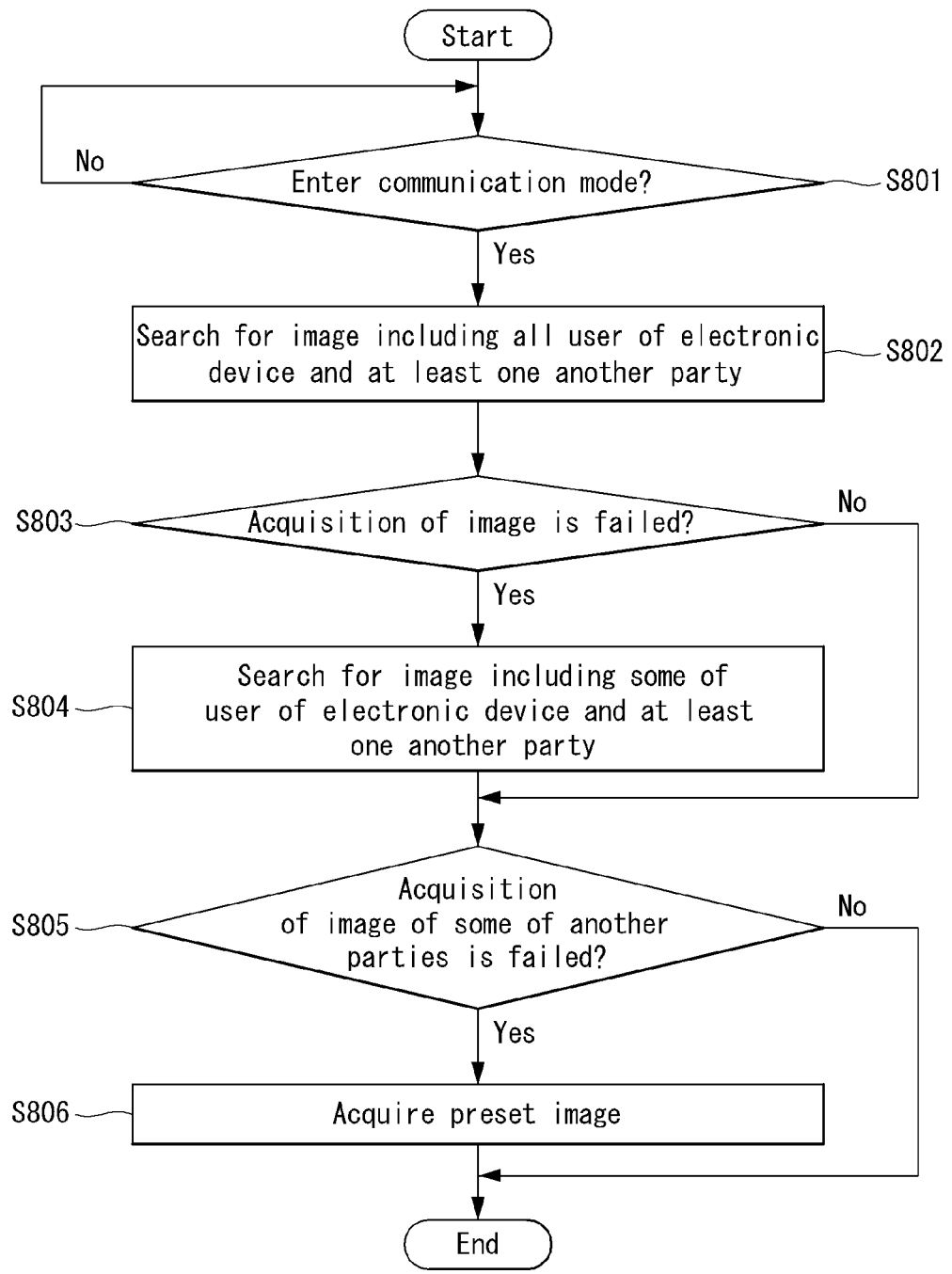
FIG. 11 is a flowchart illustrating a method of acquiring an image displayed as a background image of a message display area in an electronic device according to an embodiment of the present invention.

FIG. 11 is a flowchart illustrating a method of acquiring an image displayed as a background image of a message display area in an electronic device according to an embodiment of the present invention.

Referring to FIG. 11, the controller 180 determines whether the electronic device 100 enters a communication mode to communicate using an instant message with at least one other party (S801), and if the electronic device 100 enters a communication mode to communicate using an instant message with at least one other party (Yes in S801), the controller 180 searches for an image including all the user of the electronic device 100 and at least one other party transmitting/receiving an instant message with the user of the electronic device 100 (S802). That is, the controller 180 searches for an image including all users communicating using an instant message in a communication mode.

Further, when an image acquired through step S802 is plural, the controller 180 selects one of a plurality of images based on at least one reference. For example, the controller 180 may select an image in which a generation time, an adjustment time, or an acquisition time is the latest among a plurality of images. Further, for example, the controller 180 may display a list of a plurality of images on the touch screen 151 and select the selected one image based on a touch gesture of the list.

The controller 180 determines whether acquisition of an image including all of the user of the electronic device 100 and at least one other party transmitting/receiving an instant message with the user of the electronic device 100 has failed (S803), and if so (Yes in S803), the controller 180 acquires at least one image including the user of the electronic device 100 and at least one other party transmitting/receiving an instant message with the user of the electronic device 100 (S804). For example, when the user of the electronic device 100 communicates with three other users A, B, and C, if an image including all of the user of the electronic device 100 and three other users A, B, and C does not exist, the controller 180 may separately acquire an image including the user of the electronic device 100, an image including other users A and B, and an image including another user C.

Further, the controller 180 determines whether acquisition of an image of some of other parties transmitting/receiving an instant message has failed (S805), and if so (Yes in S805), the controller 180 acquires a preset basic image of some other party in which image acquisition has failed as a corresponding image (S806).

At steps S802 and S804, the controller 180 enters a communication mode among contents previously stored in the memory 160 based on contact information of each user transmitting/receiving an instant message in a communication mode and searches for an image including at least one user transmitting/receiving an instant message.

The memory 160 stores tag information including personal information of a person corresponding to each image and to correspond to the person information. When persons included in each image are plural, the memory 160 may store tag information of each person included in each image and to correspond to person information.

Personal information included in tag information may include a social security number, a nickname, a phone number, an address, and an e-mail for representing a person included in a corresponding image. Such tag information may be set by the user and be automatically set based on face recognition of each image. In the latter case, the controller 180 performs face recognition of images stored in the memory 160 based on a user image included in each of previously stored contact information. Further, the controller 180 determines a person included in each image based on a face recognition result and generates tag information including personal information of a person included in each image.

The controller 180 enters a communication mode based on tag information corresponding to each image and searches for an image including at least one user transmitting/receiving an instant message. That is, the controller 180 enters a communication mode among previously stored images and searches for an image corresponding to tag information including a social security number, a nickname, a phone number, and an e-mail of at least one user transmitting/receiving an instant message.

Further, the controller 180 acquires an image including at least one user transmitting/receiving an instant message by entering a communication mode among images stored in the memory 160 based on face recognition of images previously stored in the memory 160. The controller 180 enters a communication mode, acquires a user image from contact information of users transmitting/receiving an instant message, and performs face recognition of each image using the user image. For example, with respect to each image previously stored at the memory 160, the controller 180 performs face recognition using a user image included in contact information of users transmitting/receiving an instant message.

Further, at steps S802 and S804, the controller 180 enters a communication mode and acquires a social network service account of each user based on contact information of users transmitting/receiving an instant message. The controller 180 may acquire one of images stored in at least one social network server based on the social network service account. For example, the controller 180 connects to at least one social network server based on a social network service account of users transmitting/receiving an instant message. Further, the controller 180 acquires an image including at least one user among images previously stored at the social network server to correspond to a social network account of each user. A method of acquiring an image including another user among images stored in the social network server may be performed similar to a method of acquiring an image including another user among images stored in the memory 160. Further, for example, the controller 180 may acquire a most recently stored image among images previously stored at the social network server as an image corresponding to users transmitting/receiving an instant message to correspond to a social network account of users transmitting/receiving an instant message.

The controller 180 acquires at least one image corresponding to users transmitting/receiving an instant message through steps S802 to S806 and acquires a background image of a message display area using the acquired image.

FIGS. 12 to 16 illustrate examples of acquiring a background image displayed in a message display area.

Figure 12:
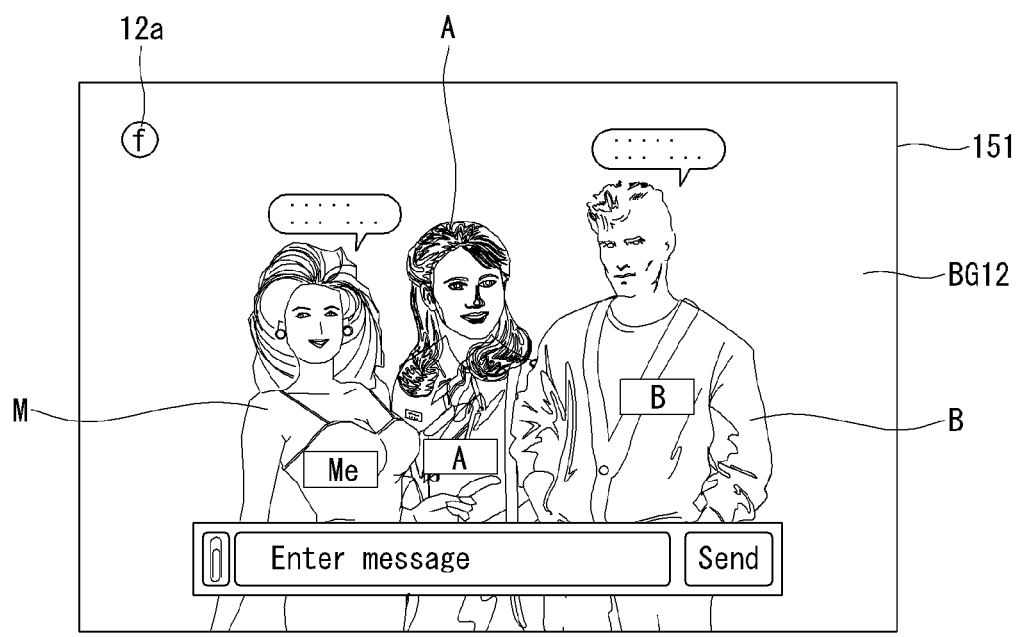
FIGS. 12 to 26 illustrate examples of displaying a background image of a message display area in an electronic device according to an embodiment of the present invention.

Referring to FIG. 12, the controller 180 enters a communication mode for transmitting/receiving an instant message with two other users A and B using an instant message. Further, as entering the communication mode, the controller 180 attempts acquisition of an image including all users A, B, and M transmitting/receiving an instant message. When an image including all users A, B, and M is acquired, the controller 180 displays the acquired image as a background image BG12 of the message display area.

When the image acquired as a background image is an image acquired from the social network server based on a social network account of one of users A, B, and M transmitting/receiving an instant message, the controller 180 may display an icon 12a representing that a corresponding image is an image acquired through the social network server on the screen, as shown in FIG. 12.

Referring again to FIG. 11, when an object in addition to persons entered in a communication mode is included within the image acquired at step S802, for example, when a person in addition to persons entered in a communication mode is included, the controller 180 may cut only an image of a partial area in which users transmitting/receiving an actual instant message are displayed from the acquired image and to display the image on a screen.

Figure 13:
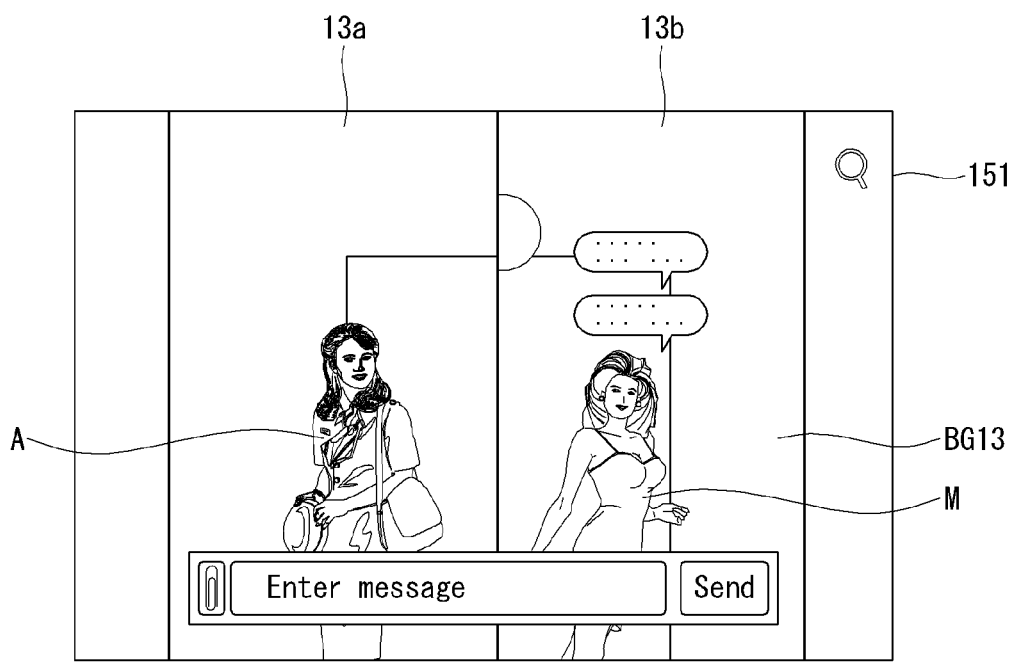

Referring to FIG. 13, the controller 180 enters a mode to communicate with another user A using an instant message. The controller 180 acquires an image including all users A and M entered in a communication mode.

When persons in addition to users A and M while communicating are included in the acquired image, the controller 180 displays a background image BG13 of the message display area using only partial areas 13a and 13b in which users A and M while communicating using an instant message are displayed in the acquired image.

Referring again to FIG. 11, when acquisition of an image including all users while communicating using an instant message has failed, the controller 180 may display a background image using images including a portion of them, as in step S804.

Figure 14:
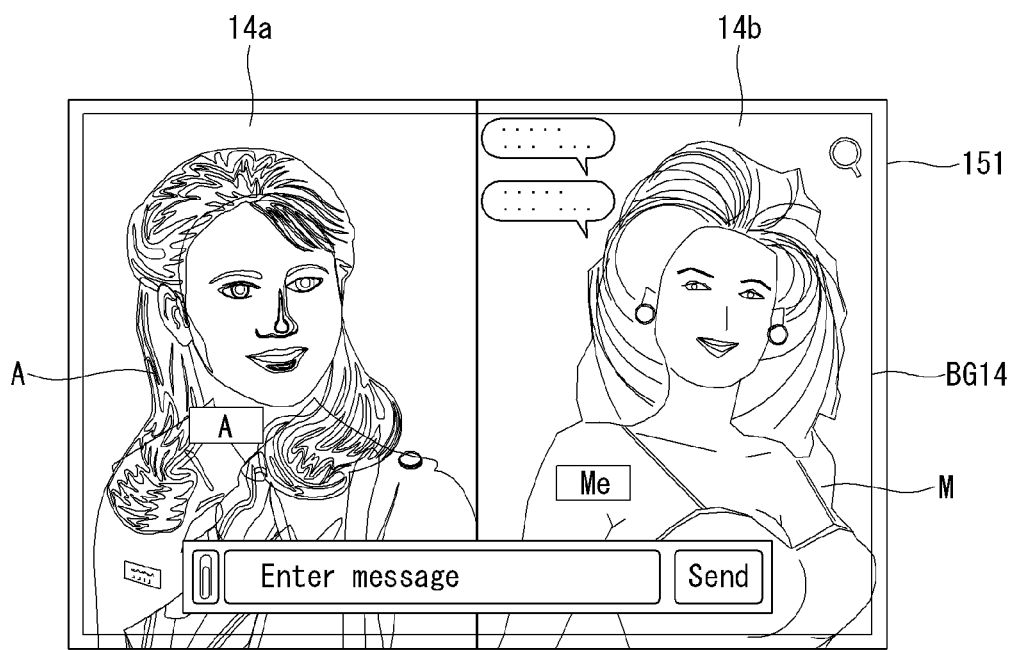

Referring to FIG. 14, when entering a communication mode of transmitting/receiving an instant message with another user A, the controller 180 attempts acquisition of an image including all users A and M while communicating using an instant message. Further, as acquisition of an image including all two users A and M has failed, the controller 180 separately acquires images 14a and 14b including each user A and M, couples the acquired images 14a and 14b, and displays the coupled image as a background image BG14 of an area in which an instant message is displayed.

Figure 15:
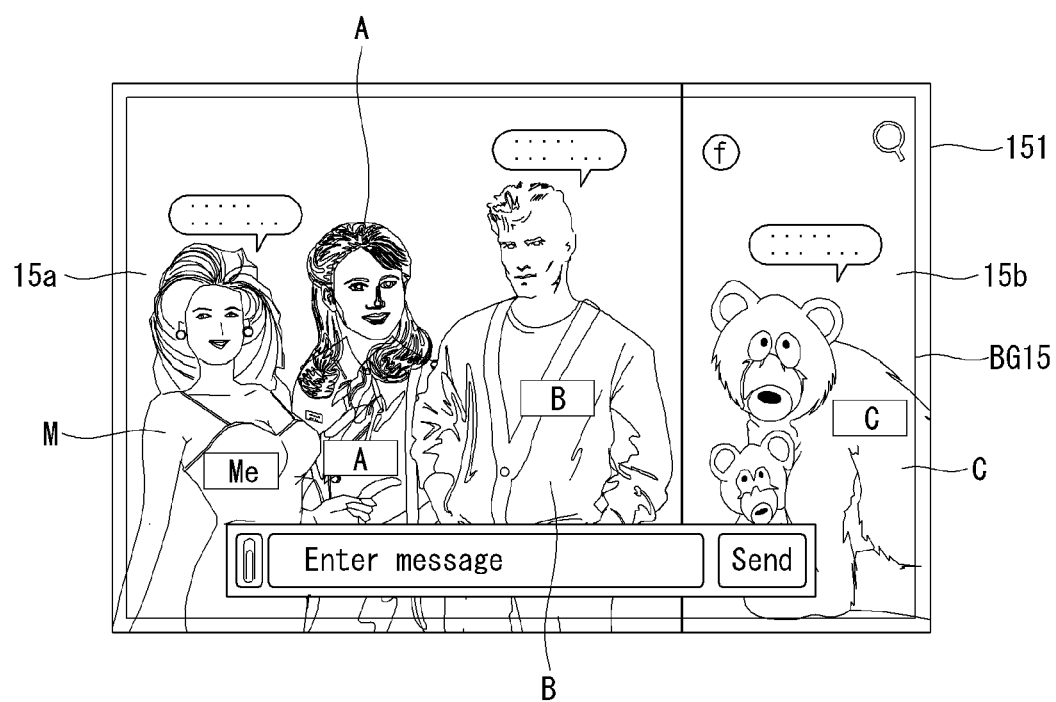

Referring to FIG. 15, the controller 180 enters a communication mode to communicate using an instant message with three other users A, B, and C. When entering a communication mode, in order to acquire a background image of the message display area, the controller 180 attempts acquisition of an image including all users A, B, C, and M included in the message transmitting/receiving group.

When acquisition of an image including all users A, B, C, and M while communicating has failed, the controller 180 attempts acquisition of an image including some of users A, B, C, and M entered in a communication mode. Accordingly, the controller 180 acquires an image 15a including some users A, B, and M of users entered in a communication mode from images previously stored in the memory 160. However, the controller 180 fails to acquire an image including the user C from images stored in the memory 160.

Accordingly, the controller 180 acquires an image 15b from a social network server based on a social network account of a corresponding user C. Referring to FIG. 15, the controller 180 acquires a most recently registered image as the image 15b of a corresponding user C from images stored in the social network server to correspond to a social network account of the corresponding user C. In this instance, the image 15b acquired from the social network server may not include the corresponding user C.

Thereafter, the controller 180 displays a background image BG15 of a message display area using the image 15a including some users A, B, and M while communicating acquired from the memory 160 and the image 15b of the user C acquired from the social network server. Further, the controller 180 may display an icon 12a representing that the image 15b acquired from the social network server is received from the social network server.

Figure 16:
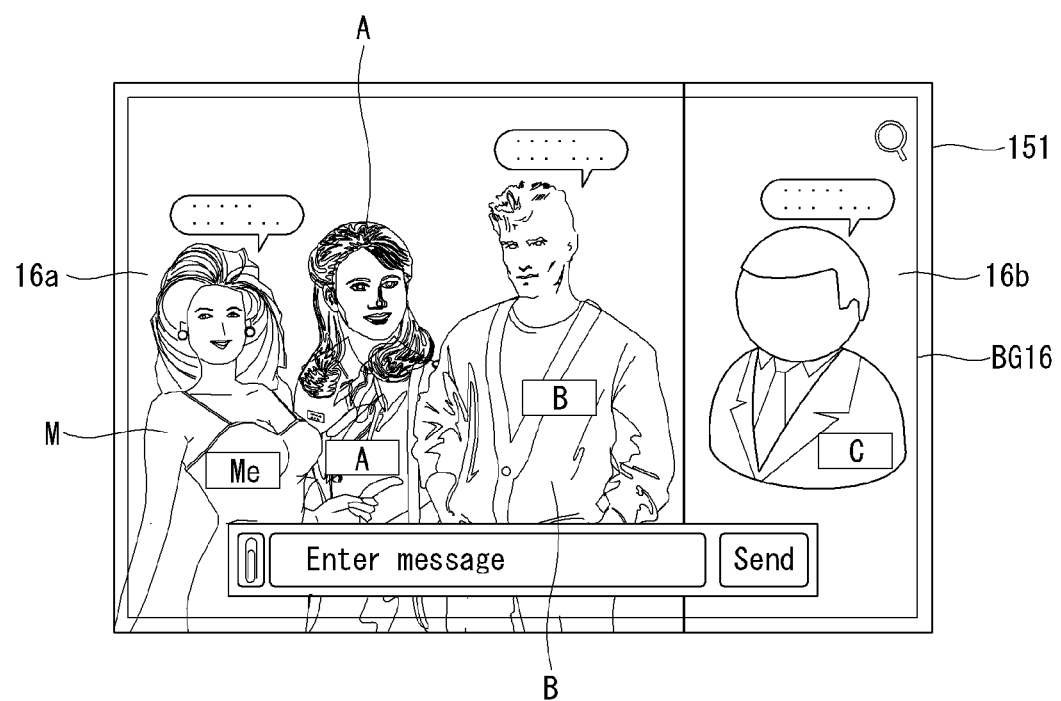

Referring to FIG. 16, the controller 180 enters a communication mode to communicate using an instant message with three other users A, B, and C. When entered in a communication mode, in order to acquire a background image of a message display area, the controller 180 attempts acquisition of an image including all users A, B, C, and M included in the message transmitting/receiving group.

When acquisition of an image including all users A, B, C, and M while communicating has failed, the controller 180 attempts acquisition of an image including some of users A, B, C, and M entered in a communication mode. Accordingly, the controller 180 acquires an image 16a including some users A, B, and M of users entered in a communication mode from images previously stored in the memory 160. However, the controller 180 fails to acquire an image including the user C from images stored in the memory 160.

Accordingly, the controller 180 attempts image acquisition from the social network server based on a social network account of the user C in which image acquisition has failed and fails image acquisition. Therefore, with respect to the user C in which acquisition of an image from the memory 160 and the social network server has failed, the controller 180 acquires a preset basic image 16b as a corresponding image.

Thereafter, the controller 180 displays a background image BG16 of the message display area using the image 16a including some users A, B, M while communicating acquired from the memory 160 and the basic image 16b of the user C in which image acquisition has failed.

Referring again to FIG. 2, when a plurality of message transmitting/receiving groups transmitting/receiving an instant message exist, the controller 180 acquires a background image on each message transmitting/receiving group basis (S104). Further, the controller 180 may display a background image of a message transmitting/receiving group selected from a plurality of message transmitting/receiving groups on an entire screen, or to display to overlap background images of each of a plurality of message transmitting/receiving groups.

Figure 17:
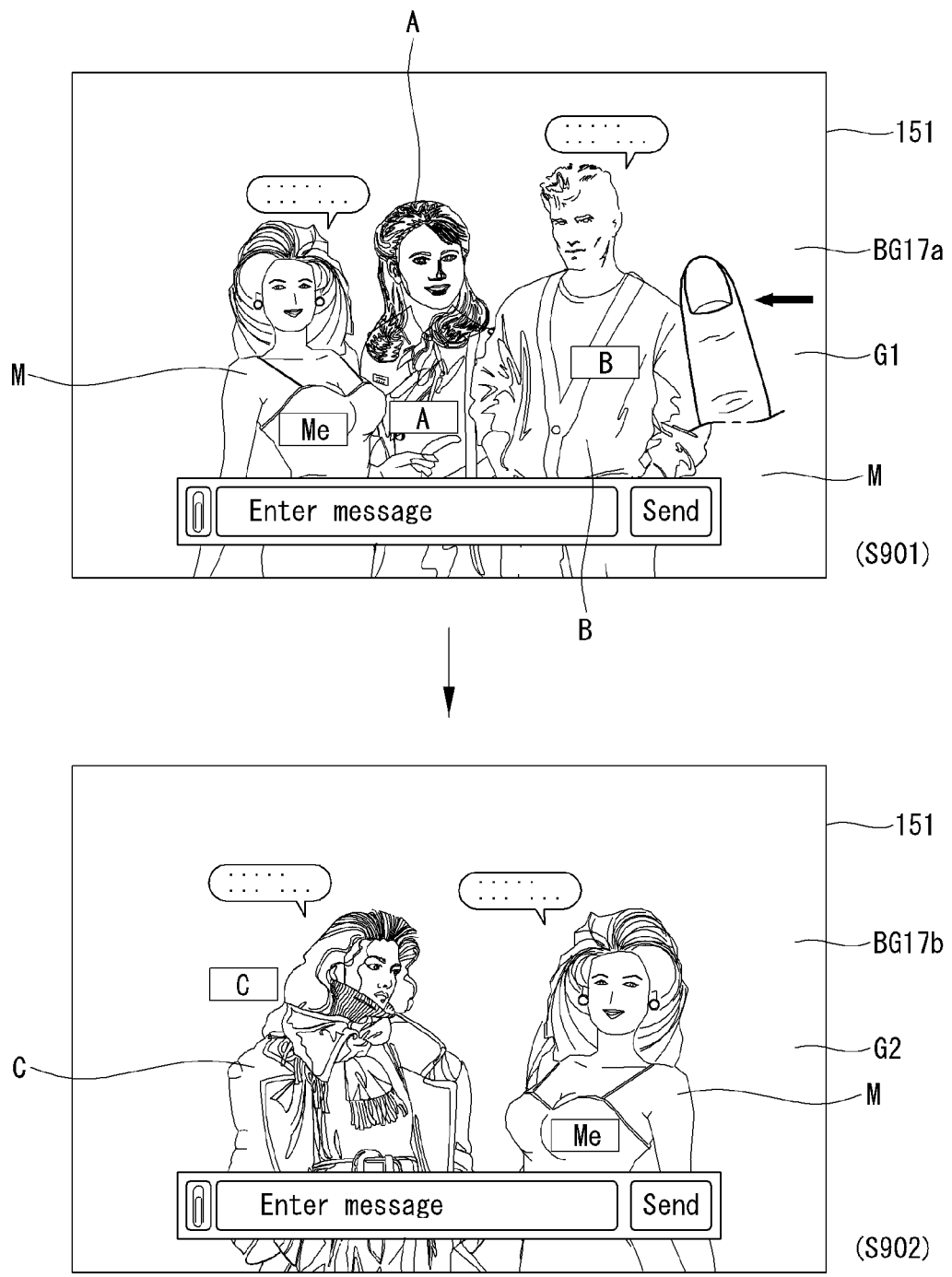
Figure 18:
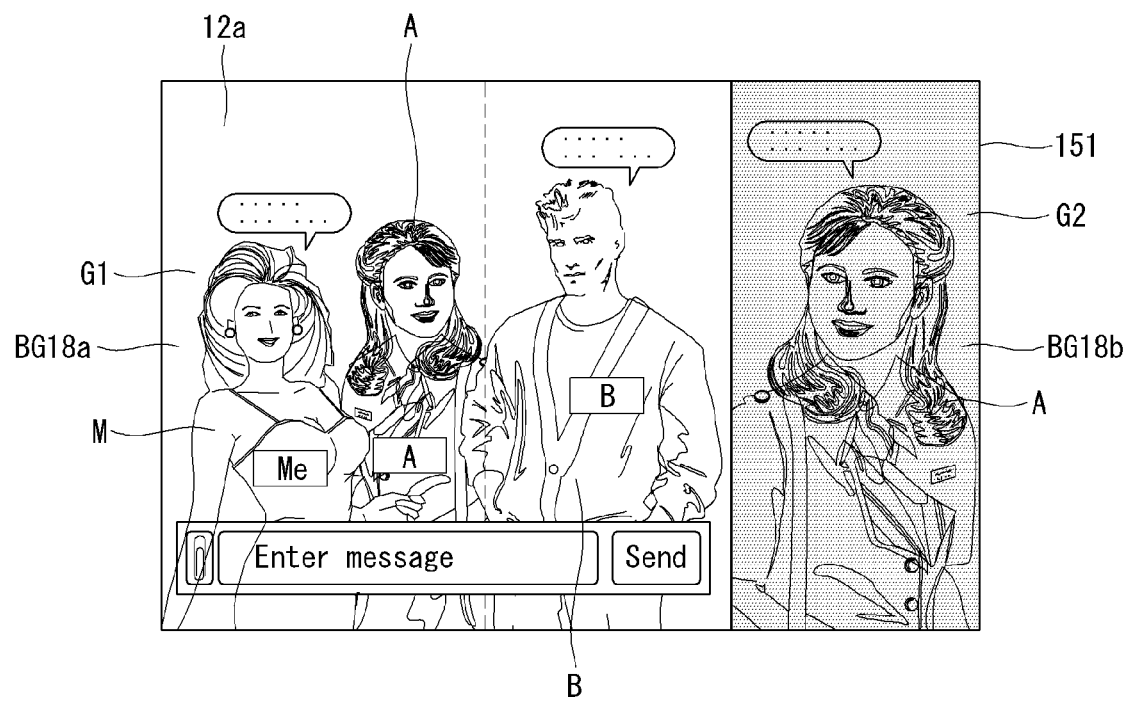
Figure 19:
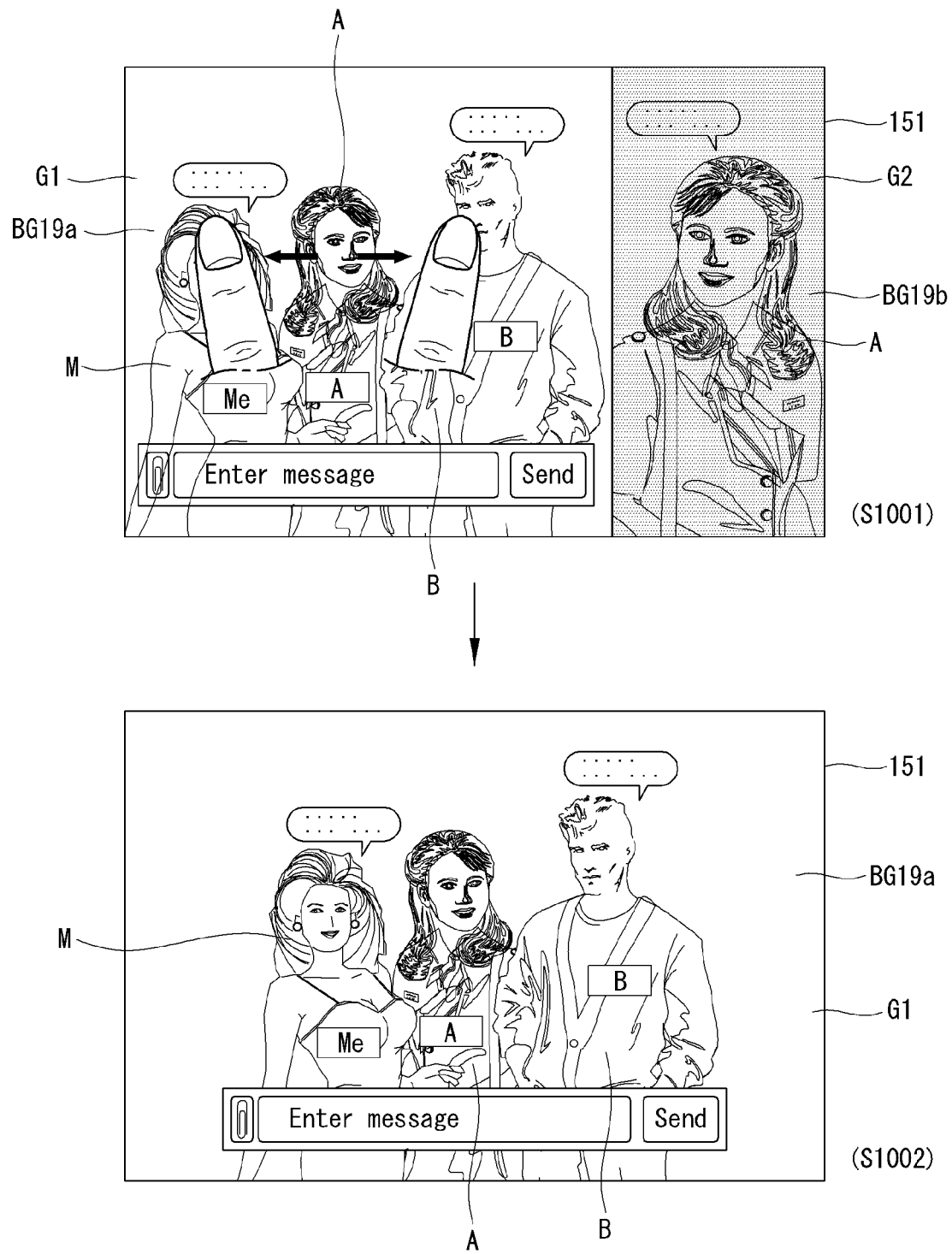

FIGS. 17 to 19 illustrate examples of displaying an instant message when a plurality of message transmitting/receiving groups transmitting/receiving an instant message are executing.

Referring to FIG. 17, in a message transmitting/receiving group communicating using a present instant message, a message transmitting/receiving group G1 including users A and B and a message transmitting/receiving group G2 including a user C are executing. With respect to each of the message transmitting/receiving groups G1 and G2, the controller 180 acquires background images BG17a and BG17b of an area in which an instant message is displayed on each message transmitting/receiving group basis using the method shown in FIG. 11.

When a plurality of message transmitting/receiving groups G1 and G2 are executing, the controller 180 partitions an area in which an instant message is displayed into a plurality of pages corresponding to other message transmitting/receiving groups G1 and G2. The controller 180 displays a page corresponding to a message transmitting/receiving group G1 of a plurality of message transmitting/receiving groups on an entire screen of the touch screen 151. That is, the controller 180 displays a background image BG17a corresponding to the selected message transmitting/receiving group G1 on the touch screen 151 and to display instant messages transmitted/received within the selected message transmitting/receiving group G1 on the background image BG17a.

Further, the controller 180 controls conversion between the message transmitting/receiving groups G1 and G2 based on a touch gesture. Referring to FIG. 17, when a page corresponding to one message transmitting/receiving group G1 is displayed on a screen, as a drag or flicking of a specific direction is input through the touch screen 151 (S901), the controller 180 moves and displays to another message transmitting/receiving group G2. That is, the controller 180 displays a page corresponding to another message transmitting/receiving group G2 on the touch screen 151 (S902). Accordingly, the controller 180 displays a background image BG17b corresponding to the moved message transmitting/receiving group G2 on the touch screen 151 and to display instant messages transmitted/received within a corresponding message transmitting/receiving group G2 on the background image BG17a.

Referring to FIG. 18, in a message transmitting/receiving group communicating using a present instant message, the message transmitting/receiving group G1 communicating with users A and B and the message transmitting/receiving group G2 communicating with the user A exist. With respect to each message transmitting/receiving groups G1 and G2, the controller 180 acquires background images BG18a and BG18b of an area in which an instant message is displayed on each message transmitting/receiving group basis using the method shown in FIG. 11.

When a plurality of the message transmitting/receiving groups G1 and G2 are executing, the controller 180 partitions a display area of the touch screen 151 into a plurality of areas corresponding to other message transmitting/receiving groups G1 and G2. Further, the controller 180 displays background images BG18a and BG18b of the message transmitting/receiving groups G1 and G2 corresponding to each area and to display instant messages transmitted/received within a corresponding message transmitting/receiving group on the background image BG18a and BG18b.

When a message display area is partitioned into a plurality of areas and a message transmitting/receiving group corresponds to each area, the controller 180 may overlap a message display area corresponding to each of the message transmitting/receiving groups G1 and G2, as shown in FIG. 18. Further, the controller 180 aligns a message display area of one message transmitting/receiving group G1 of the message transmitting/receiving groups G1 and G2 at the front side further than a message display area of the remaining message transmitting/receiving group G2. Further, in order to distinguish a message display area of the message transmitting/receiving group G1 aligned at the forefront, i.e., the selected message transmitting/receiving group G1 from a message display area of the remaining message transmitting/receiving group G2, the controller 180 differently controls a display characteristic the message transmitting/receiving group G1. For example, a message display area of the remaining message transmitting/receiving group G2 other than the selected message transmitting/receiving group G1 is processed with black and white or is processed by shading and thus the selected message transmitting/receiving group G1 and the remaining message transmitting/receiving group G2 are distinguished. Accordingly, the user can intuitively determine a presently activated message transmitting/receiving group.

FIG. 18 illustrates message display areas corresponding to each message transmitting/receiving group being overlapped, but the present invention is not limited thereto. Even when a message display area corresponding to each message transmitting/receiving group is not overlapped, a technical idea disclosed in this document can be applied. Further, in order to distinguish the selected message transmitting/receiving group from the remaining message transmitting/receiving group, FIG. 18 illustrates differently controlling a display characteristic of a message display area of the selected message transmitting/receiving group and the remaining message transmitting/receiving group, but according to the present invention, the controller 180 may distinguish the selected message transmitting/receiving group from the remaining message transmitting/receiving group by fixing the message display area of the selected message transmitting/receiving group to a specific area. For example, by disposing the message display area of the selected message transmitting/receiving group at a center of the screen, the selected message transmitting/receiving group may be distinguished from the remaining message transmitting/receiving group.

When the message transmitting/receiving group is plural according to a user's selection, the controller 180 determines whether to set the message display area of each message transmitting/receiving group as an entire screen or a partial screen. Further, the controller 180 may display a message display area of one message transmitting/receiving group from an entire screen to a partial screen or from a partial screen to an entire screen based on a user's control input.

Referring to FIG. 19, when a plurality of message transmitting/receiving groups G1 and G2 are executing, the controller 180 partitions a display area of the touch screen 151 into a plurality of areas corresponding to different message transmitting/receiving groups G1 and G2. Further, the controller 180 displays background images BG19a and BG19b of the message transmitting/receiving groups G1 and G2 corresponding to each area and to display instant messages transmitted/received within a corresponding message transmitting/receiving group on the background images BG19a and BG19b.

Thereafter, when a drag is input in a direction approaching a plurality of points in which a multi touch is performed in a message display area corresponding to any one of a plurality of message transmitting/receiving groups G1 and G2 (S1001), the controller 180 enlarges and displays a message display area of a corresponding message transmitting/receiving group G1 to an entire screen of the touch screen 151 (S1002). That is, the controller 180 enlarges an area in which a background image BG19a of the corresponding message transmitting/receiving group G1 and an instant messages are displayed to an entire screen of the touch screen 151.

Referring again to FIG. 2, after displaying the background image acquired at step S104 in the message display area, the controller 180 changes a display mode of the message display area based on a user's control input, or changes a background image displayed in the message display area.

Figure 20:
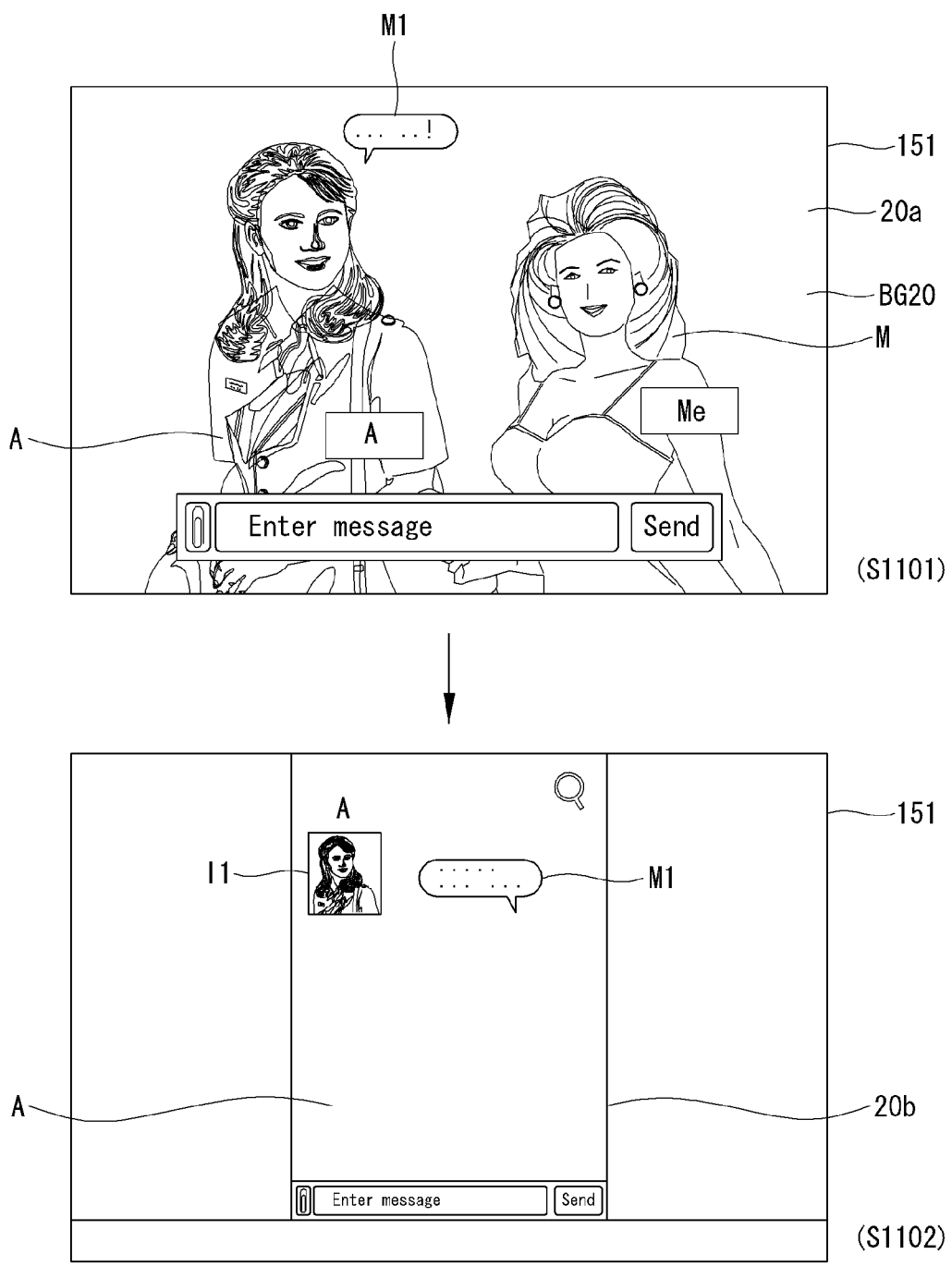
Figure 21:
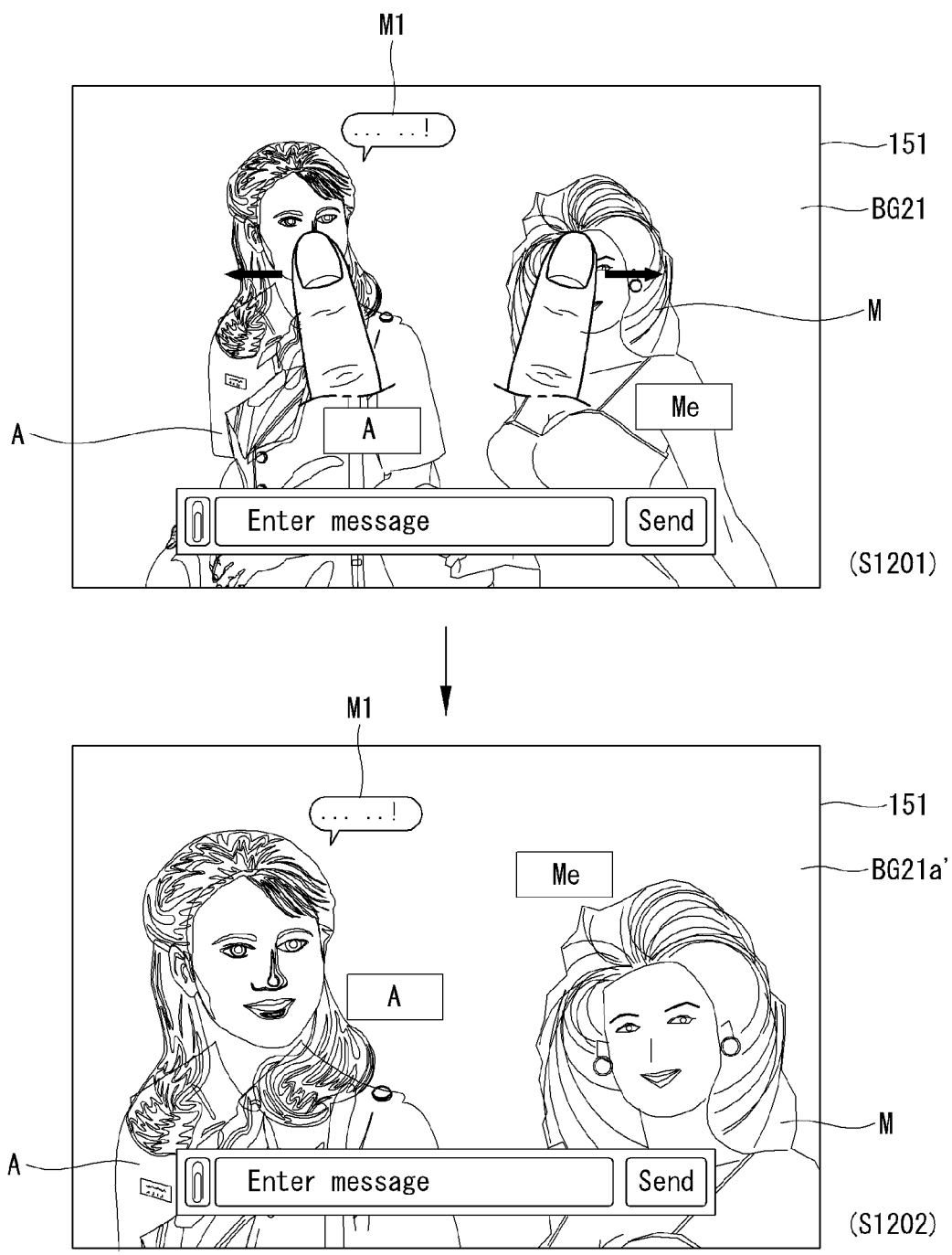
Figure 22:
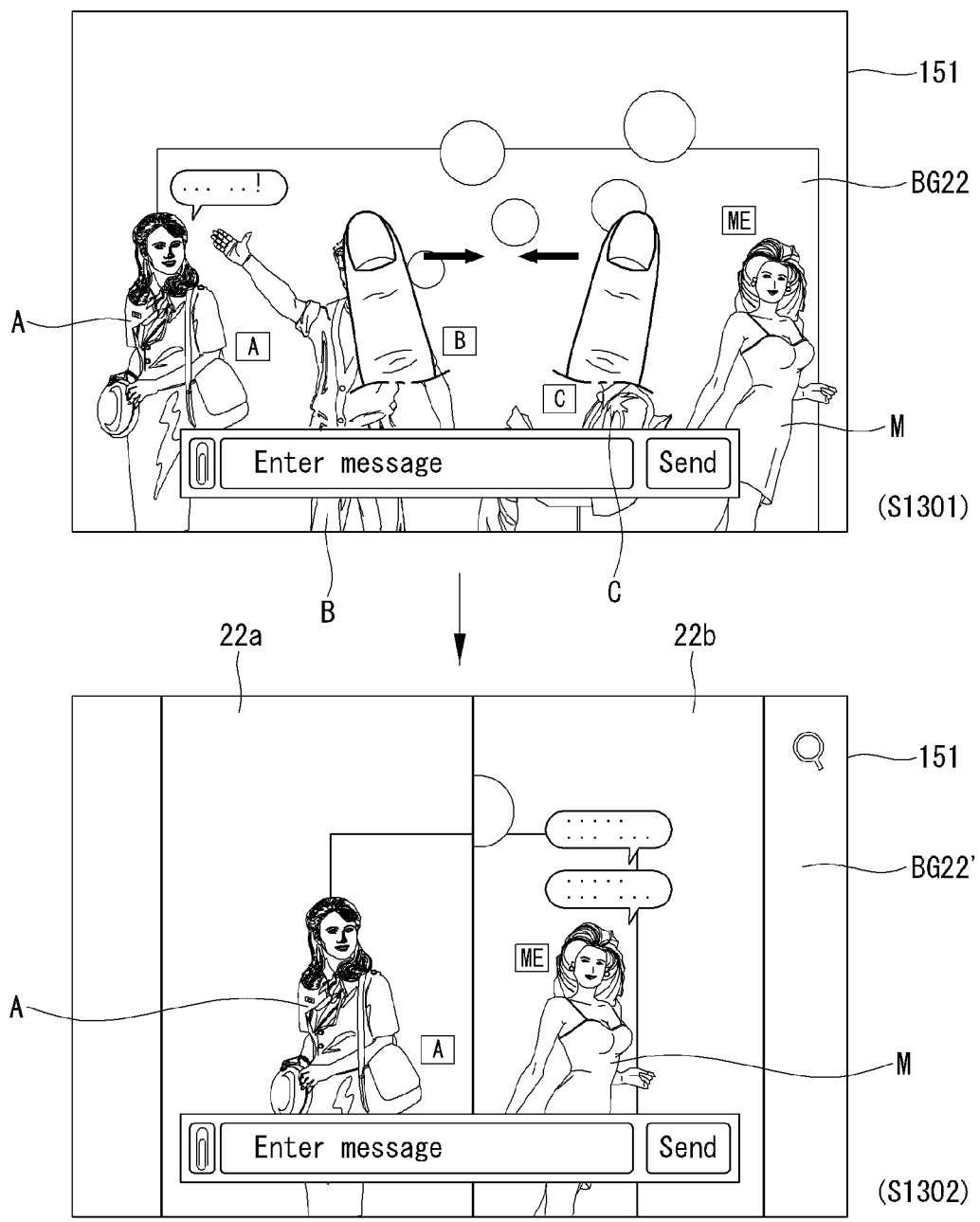
Figure 23:
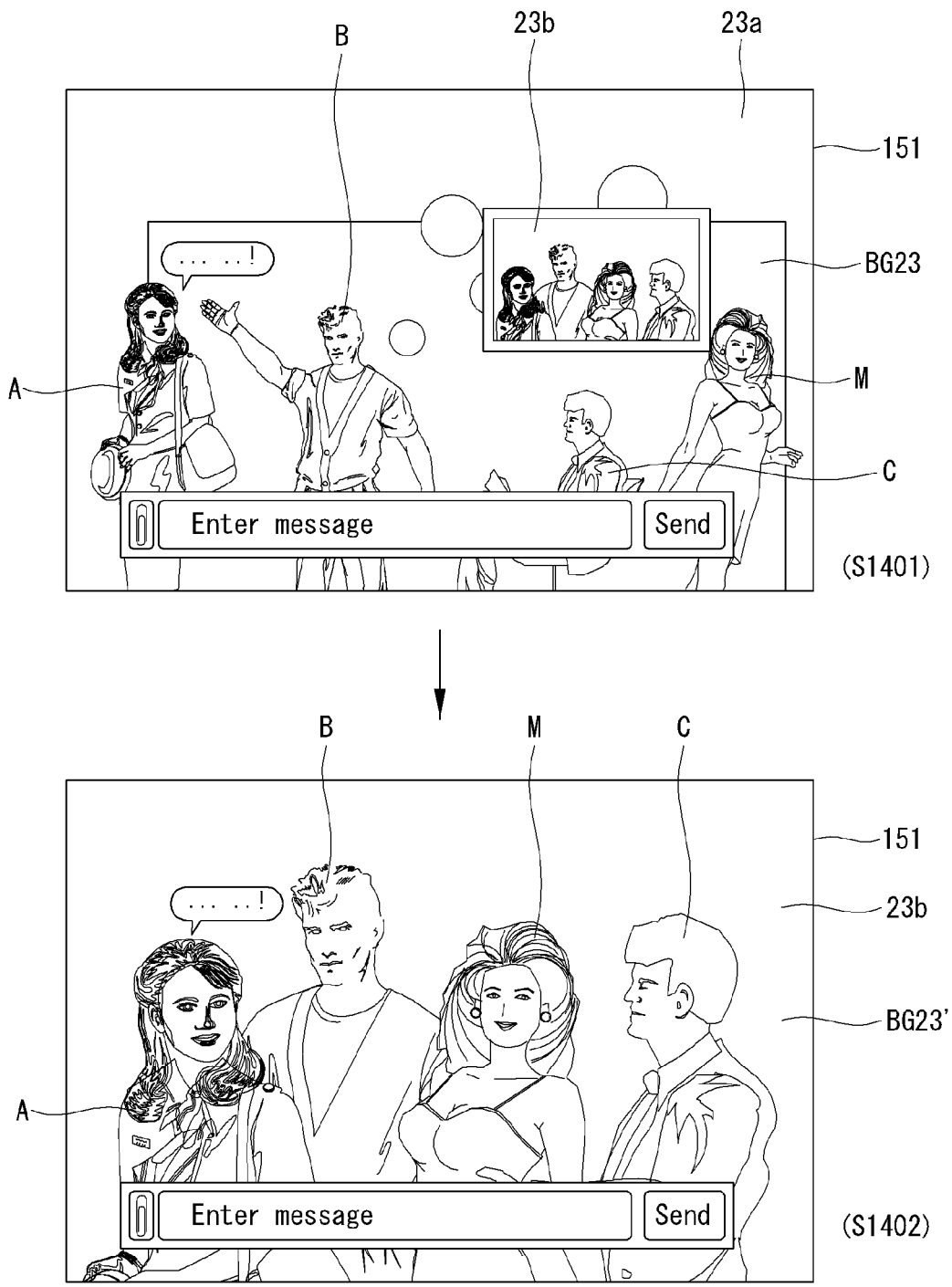

FIG. 20 illustrates an example of changing a display mode of a message display area, and FIGS. 21 to 23 illustrate examples of changing a background image of a message display area.

Referring to FIG. 20, the controller 180 enters a communication mode to communicate with another user A using an instant message. Accordingly, the controller 180 provides an entire screen as a message display area 20a. The controller 180 displays an image including both a user M of the electronic device 100 and another party A as a background image BG20 of the message display area 20a. Further, the controller 180 overlaps an instant message M1 transmitted/received between both on the background image BG20.

Thereafter, when a multi touch of the message display area 20a is performed and a drag is input in a direction approaching a plurality of points in which a multi touch is performed (S1101), the controller 180 changes a display mode of the message display area (S1102). That is, the controller 180 reduces and displays the message display area into a partial area 2b of the touch screen 151. Further, the controller 180 displays a user image I1 of another party A instead of an image BG21 including users A and M transmitting/receiving an instant message 20b. Further, the controller 180 separately displays an instant message M1 transmitted/received between both from a user image I1.

The controller 180 may enlarge or reduce only a background image displayed in the message display area based on a user's control input.

Referring to FIG. 21, the controller 180 enters a communication mode to communicate with another user A using an instant message. Accordingly, the controller 180 provides an entire screen as a message display area. The controller 180 displays an image including both a user M of the electronic device 100 and another party A as a background image BG21 of the message display area. Further, the controller 180 overlaps an instant message M1 transmitted/received between both on the background image BG21.

Thereafter, when a multi touch of the background image BG21 is performed and a drag is input in a direction approaching a plurality of points in which a multi touch is performed (S1201), the controller 180 enlarges and displays the background image BG21 (S1202). For example, the controller 180 enlarges and displays only an area in which faces of users entered in a communication mode in the background image BG21 are displayed.

Further, the controller 180 displays an instant message transmitted/received between users A and M on an enlarged background image BG21'.

The controller 180 may control to select and display only a partial area from the background image of the message display area based on a user's control input.

Referring to FIG. 22, the controller 180 enters a communication mode to communicate with another user A using an instant message. Accordingly, the controller 180 provides an entire screen as a message display area. The controller 180 displays an image including both a user M of the electronic device 100 and another party A as a background image BG22 of the message display area. Here, two other persons B and C in addition to users A and M entered in a communication mode are further displayed in the background image BG22 displayed in the message display area.

Thereafter, in an area where the background image BG22 is displayed, when a drag is input in a direction receding a plurality of points in which a multi touch is performed (S1301), the controller 180 newly displays a background image BG22' of the message display area using only partial areas 22a and 22b of the presently displayed background image BG22 (S1302). The controller 180 cuts only the partial area 22b in which the user M of the electronic device 100 is displayed from the background image BG22 and the partial area 22a in which communication another party A is displayed and displays again the background image BG22'. Here, a method of acquiring an area in which a specific person is displayed from a background image may be performed using the foregoing image recognition method and face recognition method.

The controller 180 may change the background image of the message display area to another image according to a user's request.

Referring to FIG. 23, the controller 180 enters a communication mode to communicate using an instant message with a plurality of other parties A, B, and C. Accordingly, the controller 180 displays an image 23a including users A, B, C, and M included in the message transmitting/receiving group as a background image BG23 of the message display area. Further, the controller 180 displays an instant message transmitted/received within the message transmitting/receiving group on the background image BG23.

Thereafter, when a user control input that requests a background image change of the message display area is received, the controller 180 searches for other images including users A, B, C, and M included in the message transmitting/receiving group. Further, the controller 180 displays the found image 23b on the touch screen 151 (S1401). FIG. 23 illustrates a case where a found image is one according to a background image change request, but a found image may be more than one. Further, FIG. 23 illustrates a case where a found image according to a background image change request includes all users A, B, C, and M entered in a communication mode, but a found image according to a background image change request may be an image generated by a combination of at least one image including some of users A, B, C, and M entered in a communication mode.

Referring again to FIG. 23, as a background image change using an image 23b found by the user is requested, the controller 180 displays a background image BG23' of the message display area using the newly selected image 23b (S1402). The controller 180 adjusts a display position of a transmitted/received instant message based on an area in which each of users A, B, C, and M is displayed within the newly displayed background image BG23'.

Referring again to FIG. 2, the controller 180 newly generates a message transmitting/receiving group using a background image of a message display area (S104).

Figure 24:
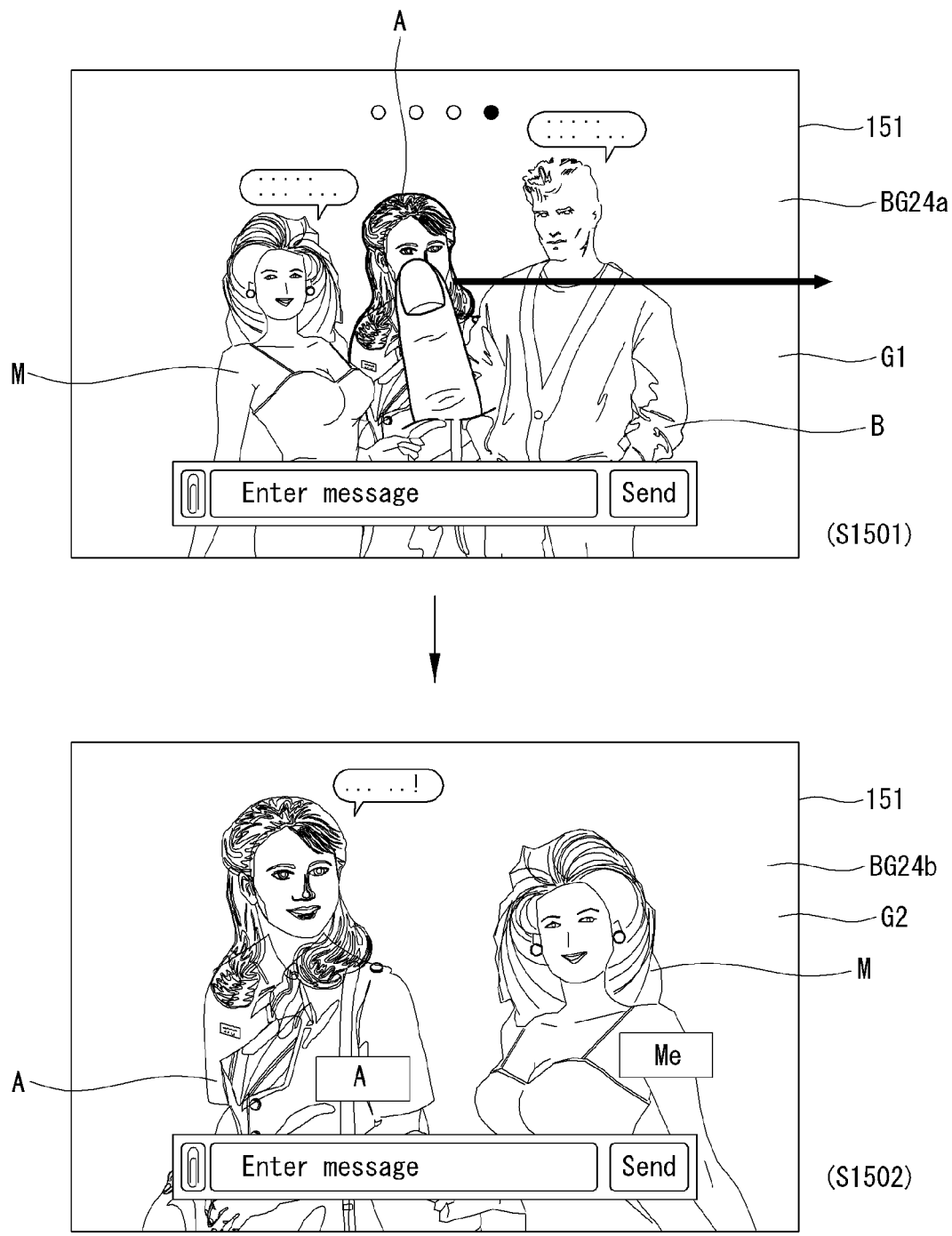
Figure 25:
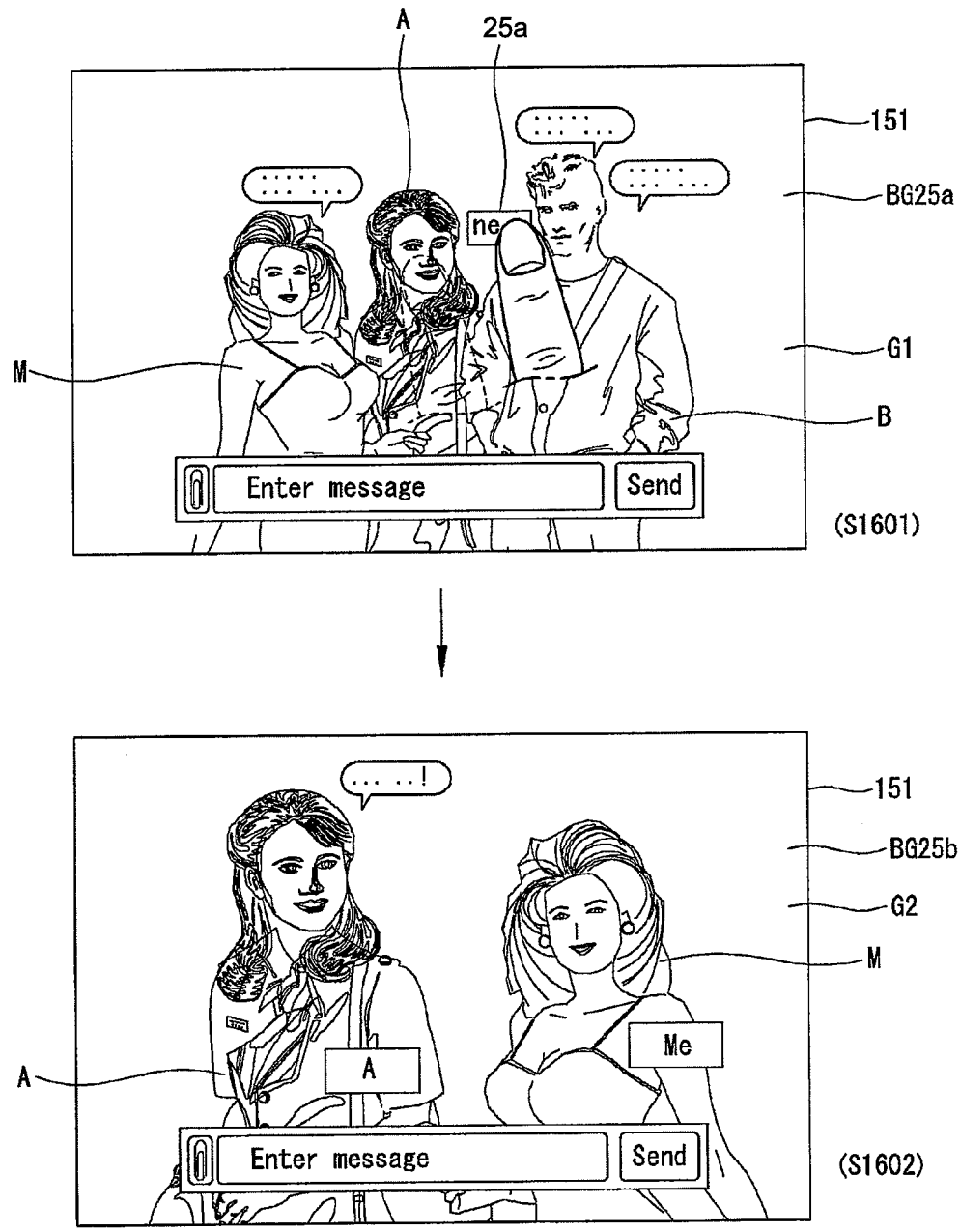

FIGS. 24 and 25 illustrate examples of newly generating a message transmitting/receiving group using the background image of the message display area.

Referring to FIG. 24, in order to display an instant message transmitted/received within the message transmitting/receiving group G1 including a user M of the electronic device 100 and a plurality of another parties A and B, the controller 180 displays an image including users A, B, and M included in the message transmitting/receiving group G1 as a background image BG24a of the message display area. Further, the controller 180 displays an instant message transmitted/received within a corresponding message transmitting/receiving group G1 on the background image.

Thereafter, when a drag occurs from an area in which communication another party A is displayed to a specific area in a background image BG24a (S1501), for example, when a drag is input from an area in which communication another party A is displayed to the outside of a display area of the touch screen 151, the controller 180 generates a new message transmitting/receiving group G2 including a corresponding user A and a user M of the electronic device 100. Further, the controller 180 acquires a background image BG24b of a newly generated message transmitting/receiving group G2 using the method of FIG. 11 and displays the acquired background image BG24b in the message display area (S1502).

Referring to FIG. 25, in order to display an instant message transmitted/received within the message transmitting/receiving group G1 including the user M of the electronic device 100 and a plurality of another parties A and B, the controller 180 displays an image including the users A, B, and M included in the message transmitting/receiving group G1 as a background image BG25a of the message display area. Further, the controller 180 displays an instant message transmitted/received within a corresponding message transmitting/receiving group G1 on the background image.

Thereafter, when communication another party A is selected from the background image BG25a and a new message transmitting/receiving group generation function 25a of the selected communication another party A is selected (S1601), the controller 180 generates a new message transmitting/receiving group G2 including a corresponding user A and a user M of the electronic device 100. Further, the controller 180 acquires a background image BG24b of the newly generated message transmitting/receiving group G2 using the method of FIG. 11 and displays an acquired background image BG25b in the message display area (S1602).

Referring again to FIG. 2, after the background image and the transmitted/received instant message are displayed in the message display area, when a phone call comes from another party while communicating in a present communication mode or when a message of a kind different from an instant message is received, the controller 180 notifies another party of this using the background image of the message display area (S104).

Figure 26:
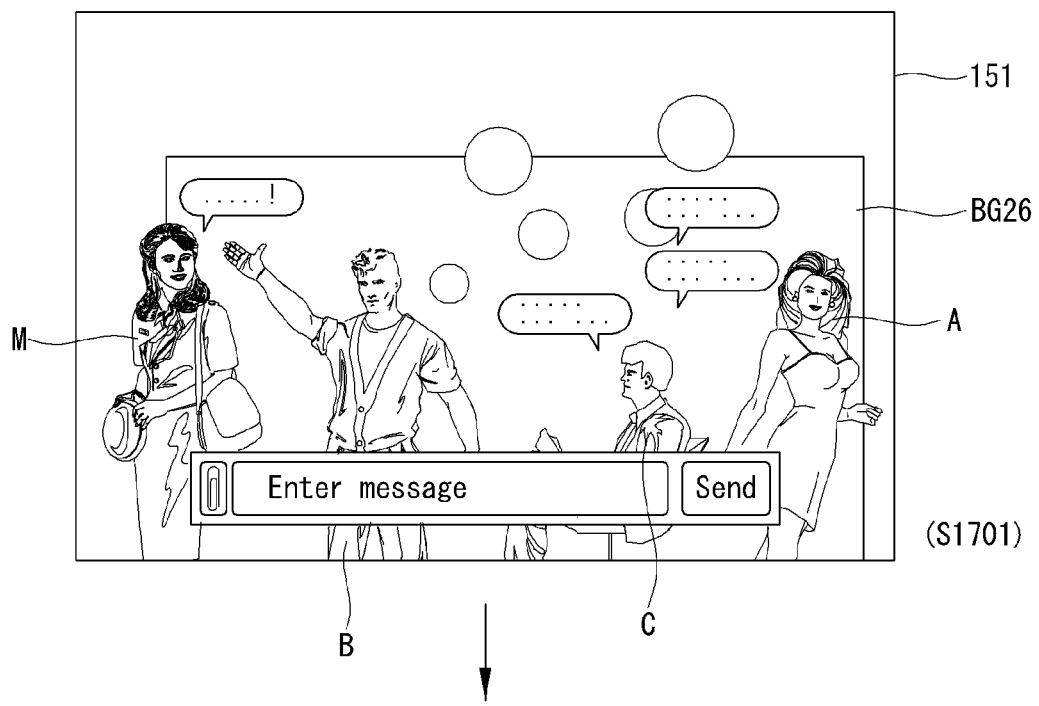
Figure 26:
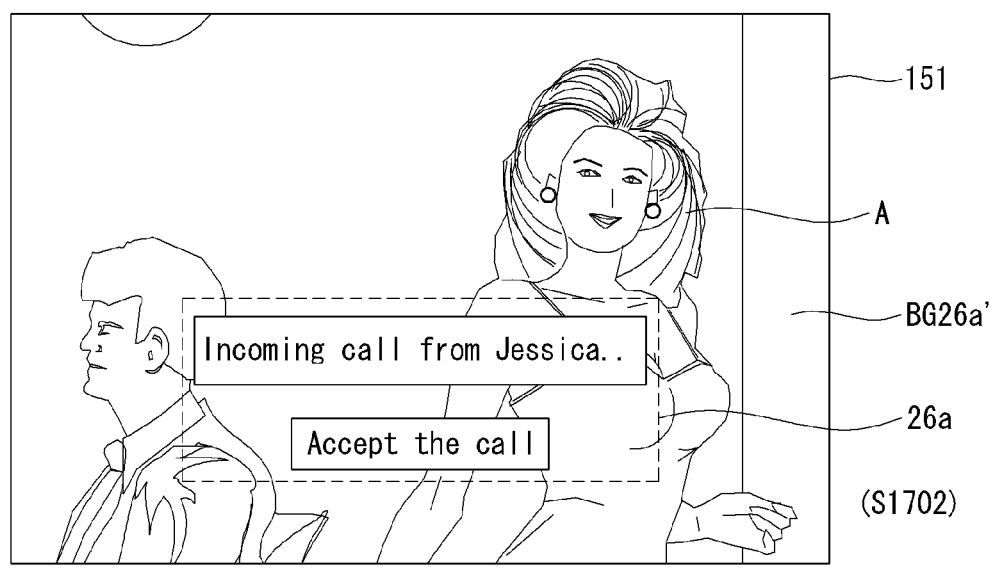

FIG. 26 illustrates an example of a case where a phone call comes from communicating another party while communicating with another party using an instant message.

Referring to FIG. 26, as entering a communication mode for communicating with a plurality of another parties A, B, and C using an instant message, the controller 180 displays an image including users A, B, and C, and M entered in a communication mode as a background image BG26 of the message display area. Further, the controller 180 displays an instant message transmitted/received between the user A, B, C, and M on the background image (S1701).

Thereafter, in a state entered in a communication mode, when a phone call comes from a specific another party A included in the message transmitting/receiving group, in order to enlarge and display an area BG26' in which another party A of the incoming call is displayed, the controller 180 enlarges and displays the background image BG26. Further, the controller 180 displays information 26a notifying that a phone call comes from another party A on the touch screen 151 (S1702).

Referring again to FIG. 2, while communicating using an instant message with at least one other user, when another party transmitting/receiving a message is added to the message transmitting/receiving group or is removed from the message transmitting/receiving group (S105), the controller 180 updates a background image of the message display area using a newly acquired image based on another user newly added to the message transmitting/receiving group or another user removed from the message transmitting/receiving group (S106).

For example, while communicating with another user A using an instant message, when another user B is added to the message transmitting/receiving group, the controller 180 may change a background image of the message display area using an image including newly added another user B as well as existing communicating another user A.

Further, for example, when another user B is removed from the message transmitting/receiving group while communicating with other users A and B using an instant message, the controller 180 may change a background image of the message display area using an image including another user A remaining in the message transmitting/receiving group.

FIGS. 27 to 31 illustrate examples of updating a background image of a message display area as another party included in a message transmitting/receiving group is changed in an electronic device according to an embodiment of the present invention.

Figure 27:
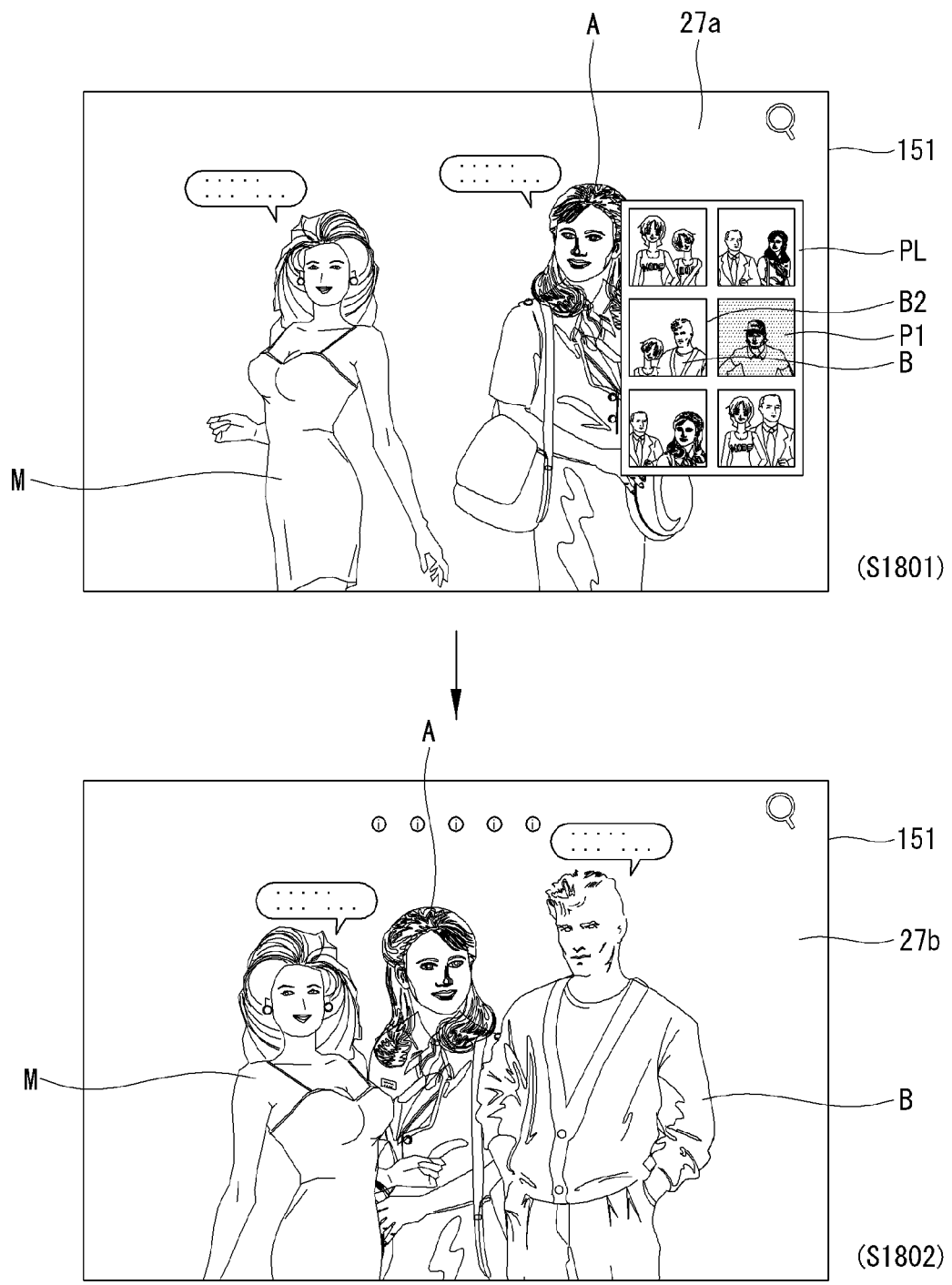
FIGS. 27 to 31 illustrate examples of updating a background image of a message display area as another party included in a message transmitting/receiving group is changed in an electronic device according to an embodiment of the present invention.

Referring to FIG. 27, as entering a communication mode to communicate with another user A using an instant message, the controller 180 displays an image 27a including the user M of the electronic device 100 and another user A as a background image of the message display area.

Thereafter, as addition of new another user to the message transmitting/receiving group is requested from the user, the controller 180 displays a list PL27 of users that can be added on the touch screen 151 (S1801). Here, the controller 180 may acquire a list PL2 of users that can be added to the message transmitting/receiving group using a friend list of the user of the electronic device 100 registered to a server for providing an instant message service. Further, with respect to other users included in the list PL27, the controller 180 displays the list PL27 using corresponding images. Images of other users included in the list PL27 may be user images acquired from corresponding contact information, or images acquired using the method shown in FIG. 11.

Further, while acquiring a friend list from a server for providing an instant message service, the controller 180 can acquire state information of each of other users included in the friend list (S1801). Further, the controller 180 may remove another user in a logout state from the server from the list PL27 based on the acquired state information or may control a display characteristic of a corresponding image in order to distinguish from other users in a log-in state while including another user in the list PL27. For example, in FIG. 27, by displaying a user image P2 of logged-out another user with black and white, the controller 180 distinguishably displays the user image P2 of logged-out another user from an image P1 of logged-in other users.

Referring again to FIG. 27, when another user B is selected from the list PL27, the controller 180 adds the selected another user B to a presently activated message transmitting/receiving group. Further, as the new user B is added to the message transmitting/receiving group, the controller 180 updates a background image 27b of the message display area to include the newly added user B as well as existing users A and M in the message transmitting/receiving group (S1802).

Figure 28:
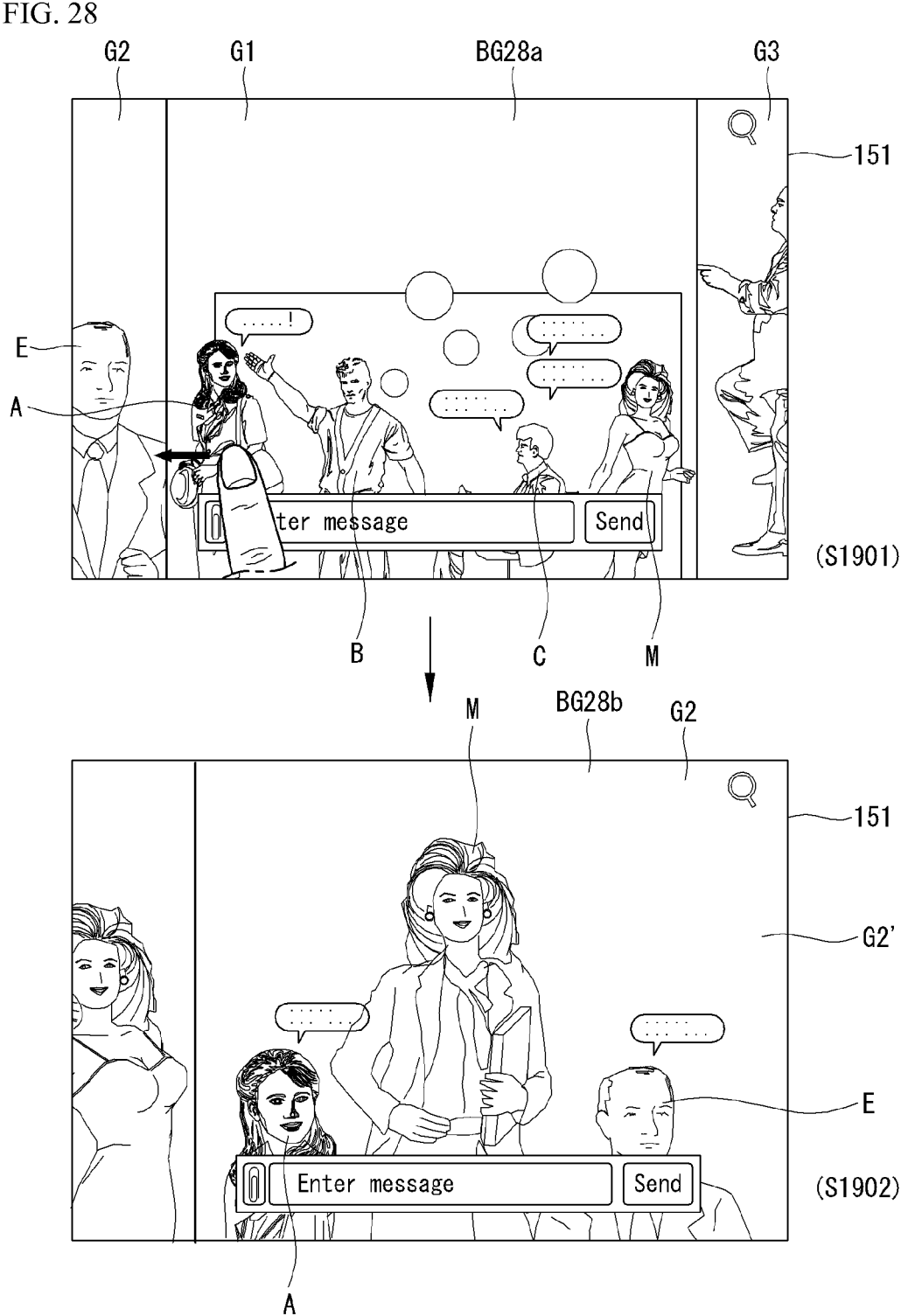

Referring to FIG. 28, a plurality of message transmitting/receiving groups G1, G2, and G3 communicating using a present instant message are executing, and with respect to each of the message transmitting/receiving groups G1 and G2, G3, the controller 180 acquires a background image of an area in which an instant message is displayed on each message transmitting/receiving group basis using the method shown in FIG. 11.

Further, the controller 180 partitions a display area of the touch screen 151 into a plurality of areas corresponding to different message transmitting/receiving groups G1, G2, and G3 and disposes a message display area of one message transmitting/receiving group G1 of the plurality of message transmitting/receiving groups G1, G2, and G3 at a center of the display area of the touch screen 151. For example, in FIG. 28, a message display area of the message transmitting/receiving group G1 communicating with other users A, B, and C using an instant message is disposed at a center of the screen.

Thereafter, when another party A is selected from a background image BG28a of one message transmitting/receiving group G1 and the selected another party A is dragged to an area in which a background image of another message transmitting/receiving group G2 is displayed (S1901), the controller 180 adds the dragged another party A to the dragged message transmitting/receiving group G2 (S1902). Accordingly, another user A is added to the message transmitting/receiving group G2 including another user E, and in order to include a newly added user A as well as existing users E and M in a corresponding message transmitting/receiving group G2, the controller 180 updates the background image BG28b of a corresponding message display area (S1902).

Figure 29:
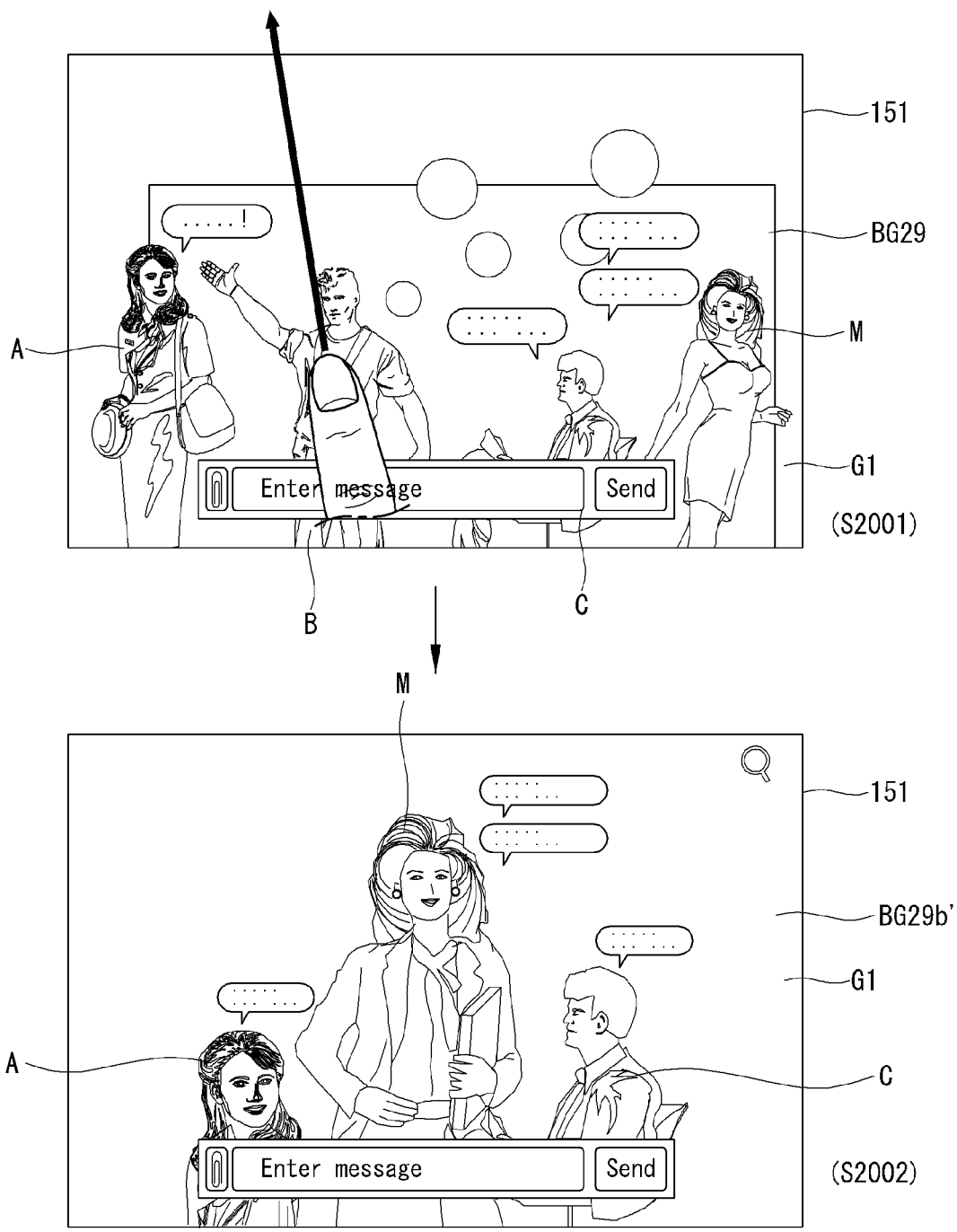

Referring to FIG. 29, the controller 180 enters a communication mode to communicate with a plurality of other users A, B, C using an instant message. Accordingly, as shown in FIG. 11, the controller 180 displays a background image BG29 of a corresponding message display area using an image including users A, B, C, and M included in the message transmitting/receiving group G1.

Thereafter, as another party B included in the message transmitting/receiving group G1 is selected from the background image BG29 and a drag of the selected another party B from a specific area, for example, a display area of the touch screen 151 to the outside is input (S2001), the controller 180 removes a corresponding user B from the message transmitting/receiving group G1. Further, the controller 180 acquires again an image including the remaining users A, C, and M remaining in the message transmitting/receiving group G1, as shown in FIG. 11 and updates a background image BG29' of a message display area using the acquired image (S2002).

Figure 30:
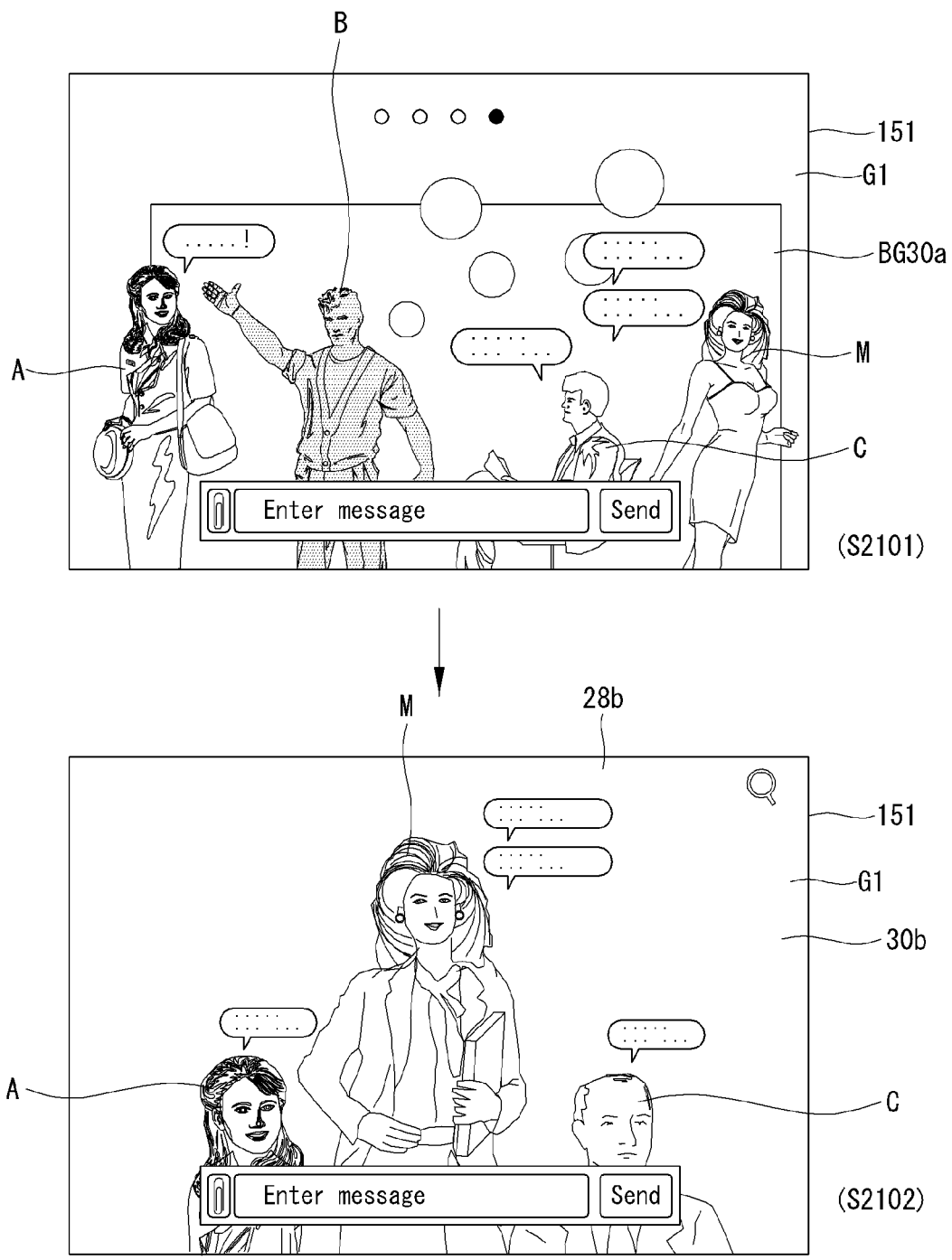

Referring to FIG. 30, the controller 180 enters a communication mode to communicate with a plurality of other users A, B, and C using an instant message. Accordingly, as shown in FIG. 11, the controller 180 displays a background image BG30 of a corresponding message display area using an image including users A, B, C, and M included in the message transmitting/receiving group G1 (S2101).

Thereafter, as another party B of another parties A, B, and C included in the message transmitting/receiving group G1 is logged out or leaves from the message transmitting/receiving group G1, the controller 180 acquires again an image including the remaining users A, C, and M remaining in the message transmitting/receiving group G1, as shown in FIG. 11 and updates a background image BG29' of the message display area using the acquired image (S2102).

Figure 31:
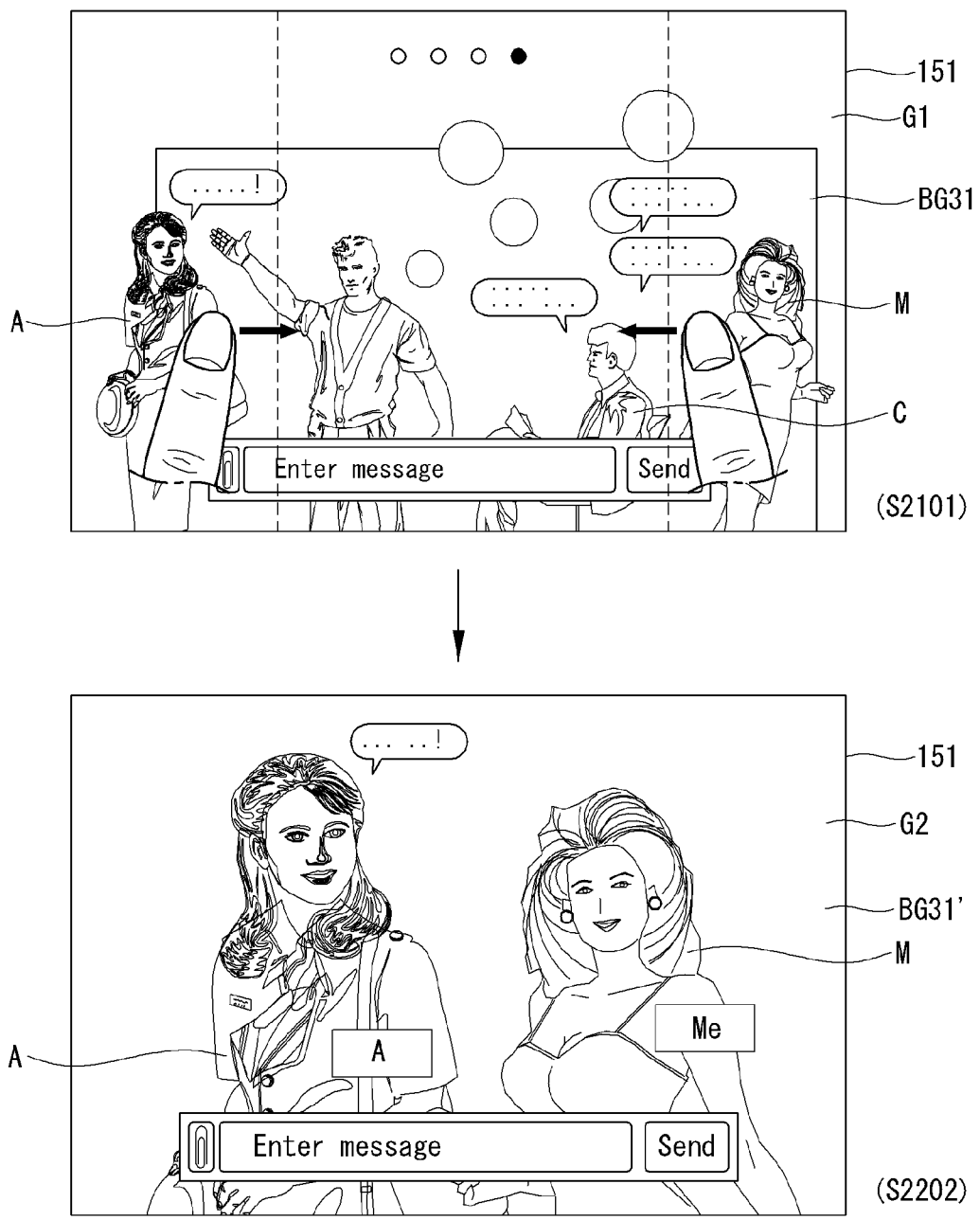

Referring to FIG. 31, the controller 180 enters a communication mode to communicate with a plurality of other users A, B, and C using an instant message. Accordingly, as shown in FIG. 11, the controller 180 displays a background image BG31 of a corresponding message display area using an image including the users A, B, C, and M included in the message transmitting/receiving group G1.

Thereafter, when a multi touch of a plurality of points of the background image BG31 is performed and a drag is input in a direction approaching a plurality of points in which a multi touch is performed (S2201), the controller 180 removes another parties B and C positioned in a drag direction from a plurality of points in which a multi touch is performed in the message transmitting/receiving group G1 from the message transmitting/receiving group G1. Further, as shown in FIG. 11, the controller 180 acquires again an image including other users A and M remaining in the message transmitting/receiving group G1 and updates a background image BG31' of the message display area using the acquired image (S2202).

Referring to FIGS. 28 and 29, the controller 180 can easily move communication another party to another message transmitting/receiving group, remove communication another party from the message transmitting/receiving group, or newly add communication another party to the message transmitting/receiving group based on a touch gesture of the background image. Accordingly, user convenience is improved.

Referring again to FIG. 2, as a communication mode is terminated or another application is executed, until a display of an instant message is terminated (S107), when a user included in the message transmitting/receiving group is changed, the controller 180 continuously performs steps S105 and 106 of changing a background image of a corresponding message display area based on the changed user. Accordingly, the user can intuitively recognize that while transmitting/receiving an instant message as a group with other users, any one user is removed from the message transmitting/receiving group or a new user is added to the message transmitting/receiving group.

When an instant message application is terminated or a message transmitting/receiving group is released, the controller 180 inactivates a message display area and terminates a display of an instant message.

According to the foregoing embodiment of the present invention, the user can intuitively determine another party that transmits and receives a message.

Further, when communicating with another party using a message, or when displaying a message transmitting/receiving with another party on a screen, user convenience is improved.

Further, when adding a user to a message transmitting/receiving group in which at least one user communicates using a message, or when removing any one user from the message transmitting/receiving group, user convenience is improved.

The above-described method of controlling the electronic device may be written as computer programs and may be implemented in digital microprocessors that execute the programs using a computer readable recording medium. The method of controlling the electronic device may be executed through software. The software may include code segments that perform required tasks. Programs or code segments may also be stored in a processor readable medium or may be transmitted according to a computer data signal combined with a carrier through a transmission medium or communication network.

The computer readable recording medium may be any data storage device that can store data that can be thereafter read by a computer system. Examples of the computer readable recording medium may include read-only memory (ROM), random-access memory (RAM), CD-ROMs, DVD±ROM, DVD-RAM, magnetic tapes, floppy disks, optical data storage devices. The computer readable recording medium may also be distributed over network coupled computer systems so that the computer readable code is stored and executed in a distribution fashion.

The foregoing embodiments and advantages are merely exemplary and are not to be construed as limiting the present invention. The present teaching can be readily applied to other types of apparatuses. The description of the foregoing embodiments is intended to be illustrative, and not to limit the scope of the claims. Many alternatives, modifications, and variations will be apparent to those skilled in the art.

What is claimed is:

1. An electronic device, comprising:
a communication unit configured to communicate with at least one other party to form a messaging group comprising a user of the electronic device and the at least one other party;
a memory configured to store a plurality of images and contact information of each of the at least one other party;
a display module configured to display a first background image of a home screen and display a message transmitted or received with the at least one other party; and
a processor configured to:
search for an image comprising the user and the at least one other party of the messaging group; and
control the display module to display the searched image as a second background image of the home screen, and display the message to be overlapped on the second background image of the home screen, wherein the message is displayed within a predetermined distance from the user of the electronic device or the at least one other party,
wherein when the number of any one other party of the messaging group is changed, the processor is further configured to search again for an image comprising the user and the changed other party included in the messaging group, and control the display module to display the image comprising the user and the changed other party included in the messaging group as a third background image of the home screen, and
wherein the processor is further configured to perform face recognition of each of the plurality of images based on the contact information, and search for the image comprising the user of the electronic device and the at least one other party based on a result of the face recognition of each of the plurality of images.

2. The electronic device of claim 1, further comprising:
a memory configured to store a plurality of images and tag information comprising information about at least one person included in each of the plurality of images,
wherein the processor is further configured to search for the image comprising the user of the electronic device and the at least one other party based on the tag information.

3. The electronic device of claim 2, wherein the memory is further configured to store contact information of each of the at least one other party, and
wherein the processor is further configured to search for the image comprising the user of the electronic device and the at least one other party by comparing the contact information with the tag information.

4. The electronic device of claim 1, wherein when the image comprising the user of the electronic device and the at least one other party does not exist, the processor is further configured to search for at least one image comprising at least some of the user of the electronic device and the at least one other party, and control the display module to display in the predetermined area at least one image found in the search.

5. The electronic device of claim 1, further comprising:
a memory configured to store a plurality of images,
wherein the processor is further configured to search for the image comprising the user of the electronic device and the at least one other party among the plurality of images stored in the memory.

6. The electronic device of claim 1, wherein the communication unit is further configured to connect to at least one social network service server, and
wherein the processor is further configured to search for the image comprising the user of the electronic device and the at least one other party among a plurality of images stored in the at least one social network service server.

7. The electronic device of claim 1, wherein when a plurality of images comprising the user of the electronic device and at least one other party are searched for, the processor is further configured to select one image of the plurality of images based on a generation time of each of the plurality of images, and control the display module to display the selected image in the predetermined area.

8. The electronic device of claim 1, wherein the processor is further configured to control the display module to display a portion of the image comprising the user of the electronic device and the at least one other party in the predetermined area.

9. The electronic device of claim 1, wherein the message is an instant message (IM).

10. The electronic device of claim 1, wherein the processor is further configured to remove a specific party from the messaging group based on a touch gesture for the specific party displayed in the image.

11. The electronic device of claim 1, wherein when a specific touch gesture for a specific party of the at least one other party displayed in the image is input, the processor is further configured to generate a messaging group comprising the specific party.

12. The electronic device of claim 1, wherein when one of a plurality of messaging groups is selected, the processor is further configured to display in the predetermined area an image comprising the user of the electronic device and at least one other party included in the selected messaging group.

13. The electronic device of claim 1, wherein when a messaging group communicating using a message transmitted or received through the communication unit is plural, the processor is further configured to search for an image comprising at least one other party and the user of the electronic device corresponding to each of the plurality of messaging groups and divide the predetermined area into a plurality of areas in order to display found images in different areas.

14. The electronic device of claim 1, wherein when a specific touch gesture for any one other party of the at least one other party in the image is input, the processor is further configured to add the any one other party to another messaging group.

15. The electronic device of claim 1, wherein the processor is further configured to differently set a display characteristic of at least one person corresponding to the at least one other party included in the image from those of remaining persons.

16. The electronic device of claim 1, wherein the processor is further configured to:
acquire an area in which the at least one other party is displayed from the image; and
control the display module to display the message within a predetermined distance from the area.

17. The electronic device of claim 1, wherein the processor is further configured to acquire state information of the at least one other party, and wherein the state information is information representing a state of at least one of a log in, seat absence, on the phone, or other business of the at least one other party.

18. A method of controlling an electronic device, the method comprising:
communicating, via a communication unit of the electronic device, with at least one other party to form a messaging group comprising a user of the electronic device and the at least one other party;
storing, in a memory, a plurality of images and contact information of each of the at least one other party;
displaying a first background image of a home screen;
displaying a message transmitted or received with the at least one other party in the first background image of the home screen;
receiving a touch input to the message;
searching, via a processor of the electronic device, for an image comprising the user and the at least one other party of the messaging group among a plurality of images; and
displaying, via a display module of the electronic device, the searched image as a second background image of the home screen, and display the message to be overlapped on the second background image of the home screen, wherein the message is displayed within a predetermined distance from the user of the electronic device of the at least one other party,
wherein, when the number of any one other party of the messaging group is changed, the searching step searches again for an image comprising the user and the changed other party included in the messaging group, and the displaying step displays the image comprising the user and the changed other party included in the messaging group as a third background image of the home screen, and
wherein the processor performs face recognition of each of the plurality of images based on the contact information, and searches for the image comprising the user of the electronic device and the at least one other party based on a result of the face recognition of each of the plurality of images.

19. The method of claim 18, further comprising:
acquiring an area in which the at least one other party is displayed from the image; and
displaying the message within a predetermined distance from the area.

* * * * *